(12) United States Patent
Kagotani

(10) Patent No.: US 10,948,876 B2
(45) Date of Patent: Mar. 16, 2021

(54) OPTICAL FILM WITH RECORDING SURFACE, AND DISPLAY BODY INCLUDING OPTICAL FILM

(71) Applicant: TOPPAN PRINTING CO., LTD., Tokyo (JP)

(72) Inventor: Akihito Kagotani, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 203 days.

(21) Appl. No.: 16/203,198

(22) Filed: Nov. 28, 2018

(65) Prior Publication Data

US 2019/0094802 A1 Mar. 28, 2019

Related U.S. Application Data

(63) Continuation of application No. PCT/JP2017/020049, filed on May 30, 2017.

(30) Foreign Application Priority Data

Jun. 3, 2016 (JP) .............................. JP2016-111732

(51) Int. Cl.
*G03H 1/08* (2006.01)
*G02B 5/18* (2006.01)
(Continued)

(52) U.S. Cl.
CPC ......... *G03H 1/0808* (2013.01); *B42D 25/328* (2014.10); *G02B 5/18* (2013.01);
(Continued)

(58) Field of Classification Search
CPC ...... G03H 1/00; G03H 1/0005; G03H 1/0011; G03H 2001/0016; G03H 1/02;
(Continued)

(56) References Cited

U.S. PATENT DOCUMENTS 7,123,392 B2 * 10/2006 Kitamura ............. G03H 1/0808
359/9
7,675,680 B2 * 3/2010 Hamano ............. G02B 5/0252
359/571

(Continued)

FOREIGN PATENT DOCUMENTS

GB 2 446 693 A 8/2008
JP 6-51124 2/1994
(Continued)

OTHER PUBLICATIONS

Extended European Search Report dated May 2, 2019 in corresponding European Patent Application No. 17806666.8 (8 pages).
(Continued)

*Primary Examiner* — Arnel C Lavarias

(57) ABSTRACT

According to one embodiment, there is provided an optical film with a recording surface, the recording surface including: a computation element section in which a phase component of light from each reconstruction point of a reconstructed image is computed, the computation element section corresponding to each reconstruction point one by one; a phase angle recording area in which a phase angle computed based on the phase component is recorded; and a phase angle non-recording area in which the phase angle is not recorded, the phase angle computed based on the phase component being recorded in an overlapping area where the computation element section and the phase angle recording area overlap each other.

22 Claims, 27 Drawing Sheets

(51) Int. Cl.
*B42D 25/328* (2014.01)
*G03H 1/02* (2006.01)
*G03H 1/30* (2006.01)

(52) U.S. Cl.
CPC .............. *G03H 1/02* (2013.01); *G03H 1/0244* (2013.01); *G03H 1/08* (2013.01); *G03H 1/30* (2013.01); *G03H 2210/13* (2013.01); *G03H 2230/10* (2013.01)

(58) Field of Classification Search
CPC .... G03H 1/0236; G03H 1/024; G03H 1/0244; G03H 1/0248; G03H 1/0252; G03H 1/0256; G03H 1/0272; G03H 1/04; G03H 1/043; G03H 2001/0454; G03H 1/08; G03H 1/0808; G03H 2001/0825; G03H 1/0841; G03H 2001/085; G03H 2001/0858; G03H 1/0866; G03H 2001/0883; G03H 1/0891; G03H 1/22; G03H 1/2202; G03H 2001/2284; G03H 2240/00; G03H 2240/10; G03H 2240/11; G03H 2250/00; G03H 2250/40
USPC .............. 359/1, 2, 3, 9, 22, 32, 35; 430/1, 2; 283/72, 85, 86
See application file for complete search history.

(56) References Cited

U.S. PATENT DOCUMENTS 10,678,188 B2 * 6/2020 Zschau ................ G03H 1/2294
2003/0156306 A1 8/2003 Kitamura
2005/0206996 A1 * 9/2005 Kitamura ................ G03H 1/08
359/321
2012/0236415 A1 9/2012 Nagano et al.

FOREIGN PATENT DOCUMENTS

| JP | 9-319290 | 12/1997 |
| JP | 10-123919 | 5/1998 |
| JP | 2002-90548 | 3/2002 |
| JP | 3810934 | 8/2006 |
| JP | 2009-86146 A | 4/2009 |
| JP | 4256372 | 4/2009 |
| JP | 2009-199060 | 9/2009 |
| WO | WO 2011/068002 A1 | 6/2011 |

OTHER PUBLICATIONS

Kubota, T., "Introduction to Holography", Asakura Shoten, Nov. 20, 1995, pp. 90-97.
International Search Report dated Aug. 29, 2017 in corresponding International Application No. PCT/JP2017/020049.
Written Opinion of the International Searching Authority dated Aug. 29, 2017 in corresponding International Application No. PCT/JP2017/020049.
English Translation by WIPO of the International Preliminary Report on Patentability dated Dec. 13, 2018 in corresponding International Patent Application No. PCT/JP2017/020049, 6 pages.
Chinese Office Action dated Jun. 19, 2020, in corresponding Chinese Patent Application No. 201780034268.9.
Communication pursuant to Article 94(3) EPC dated Dec. 15, 2020 in related European Patent Application No. 17806666.8 (6 pages).

* cited by examiner

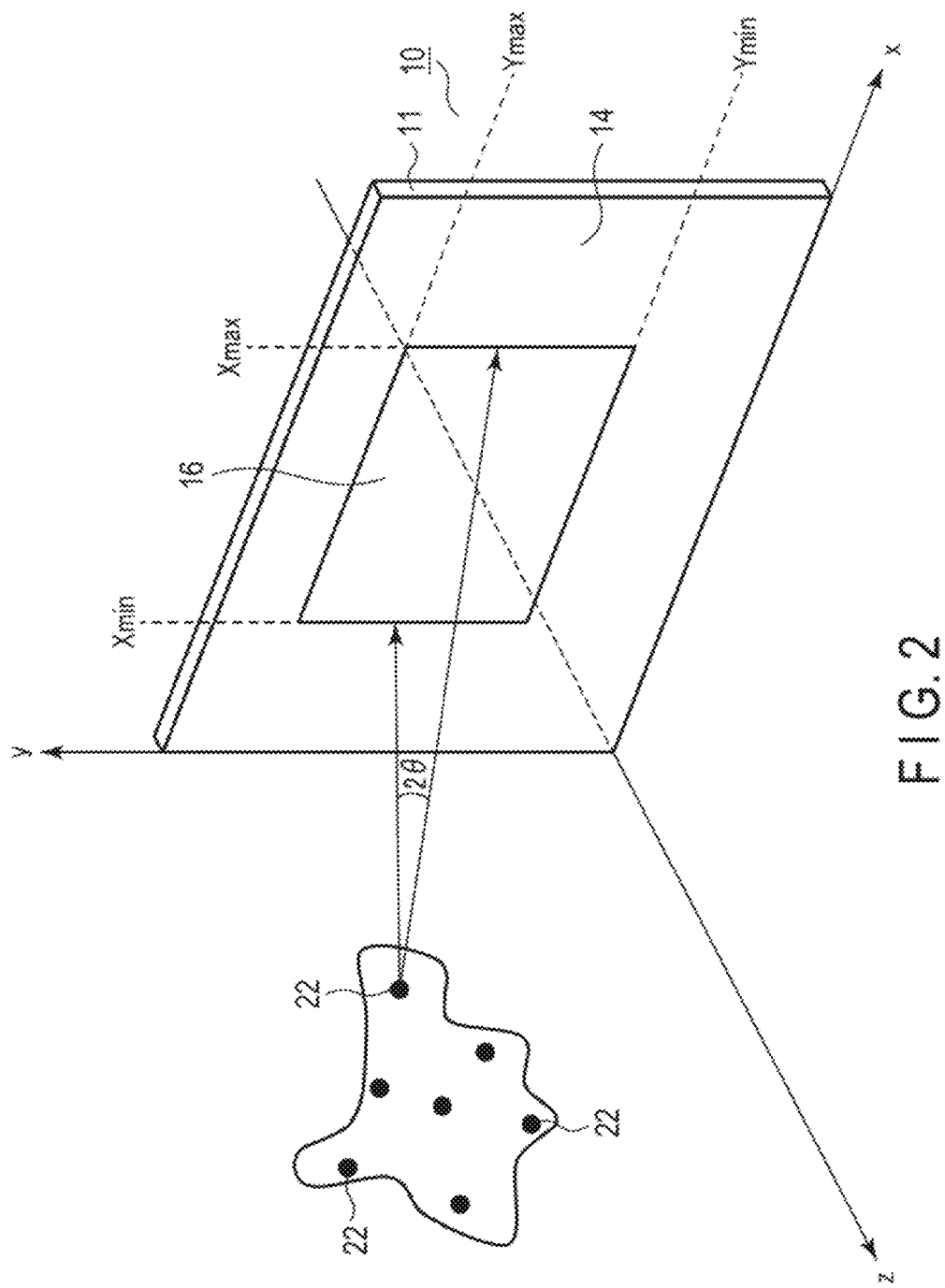
F I G. 2

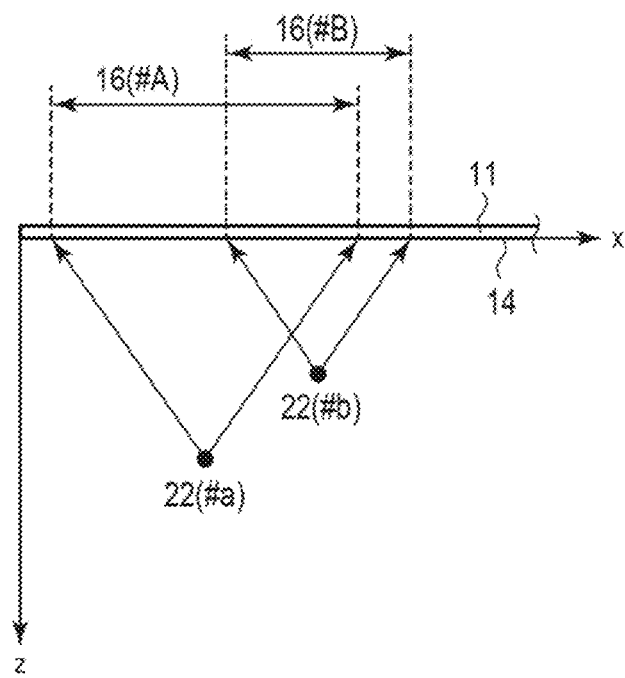
F I G. 6
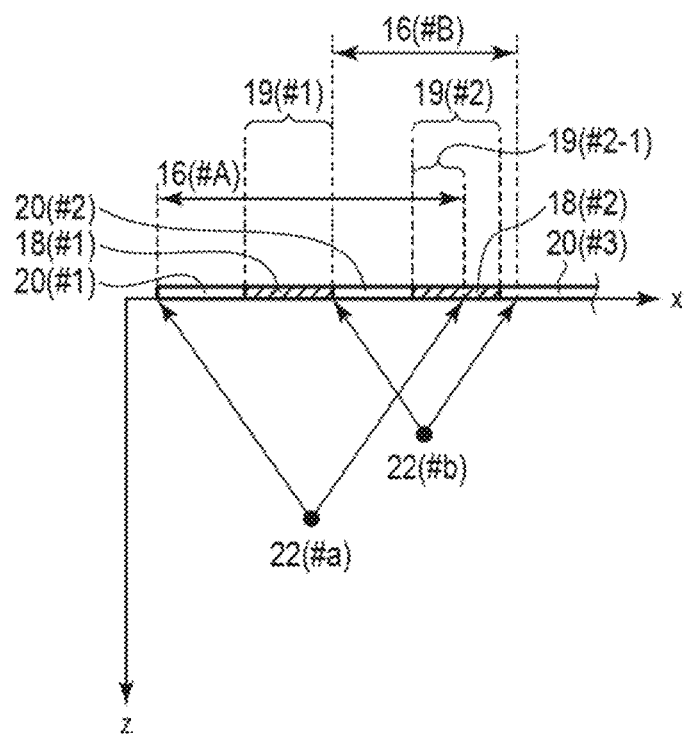
F I G. 7

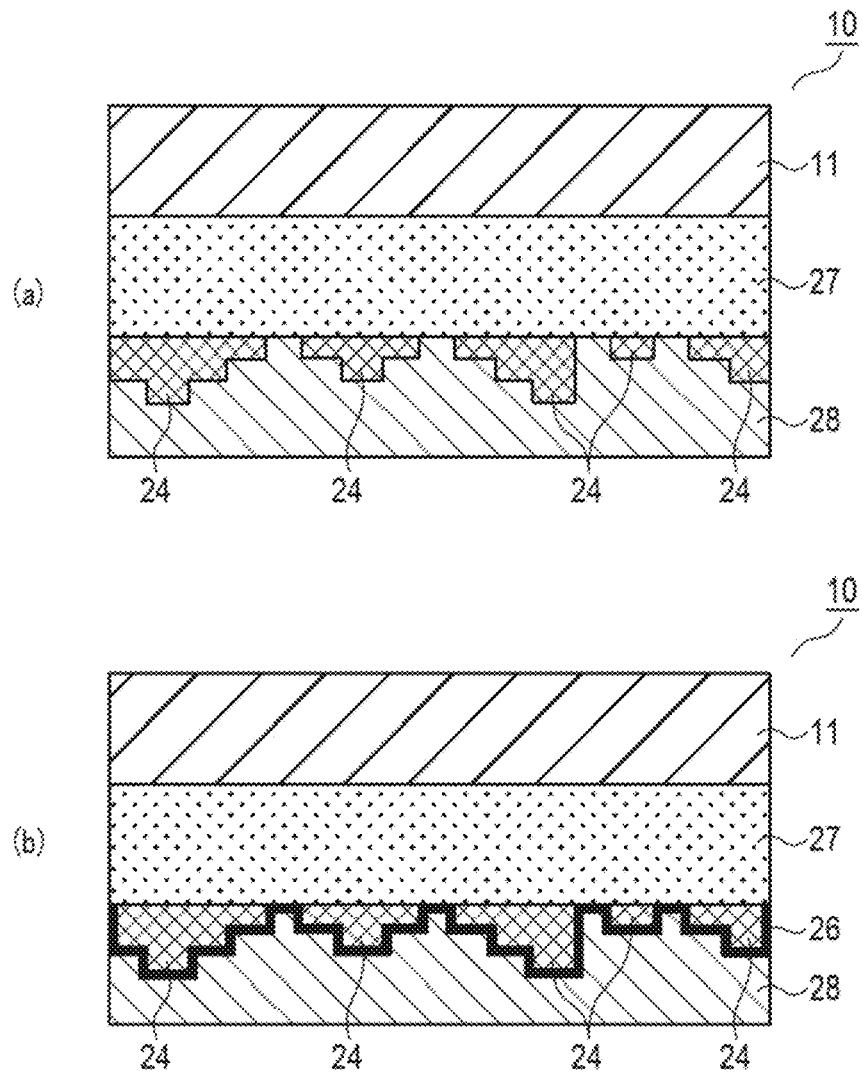
F I G. 13

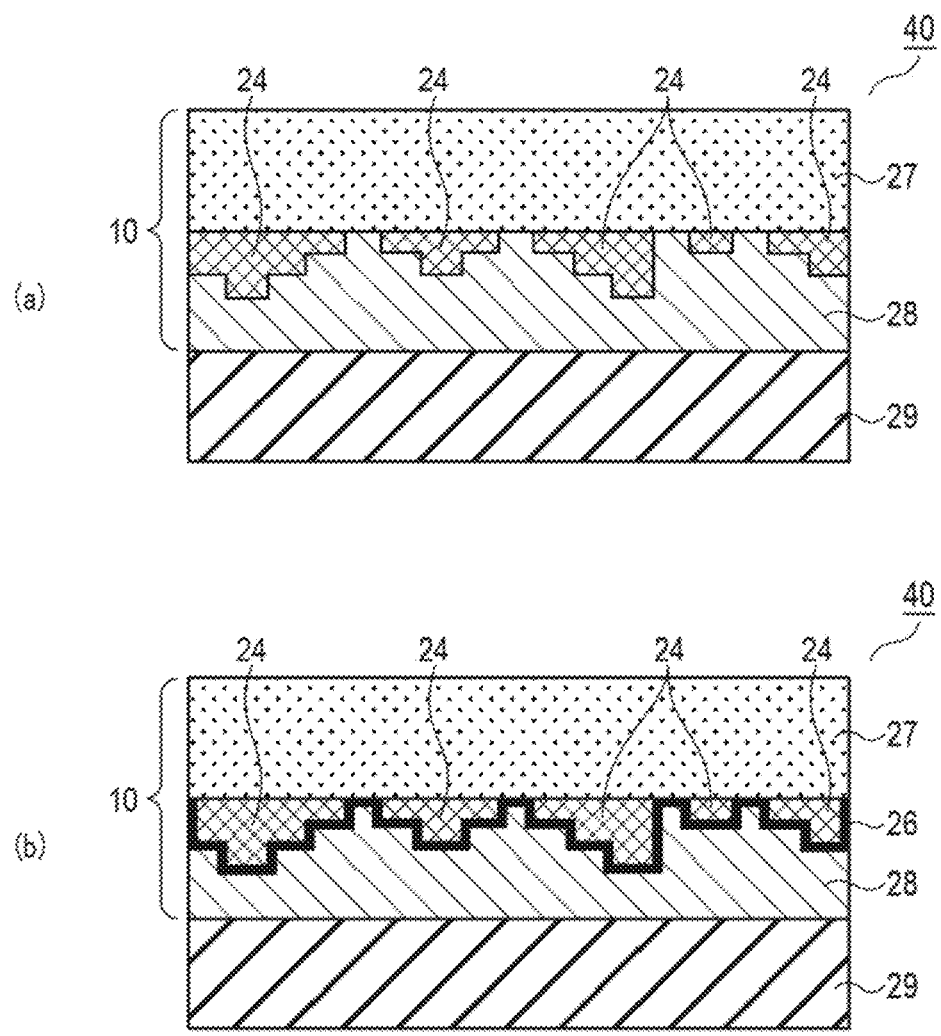
F I G. 14

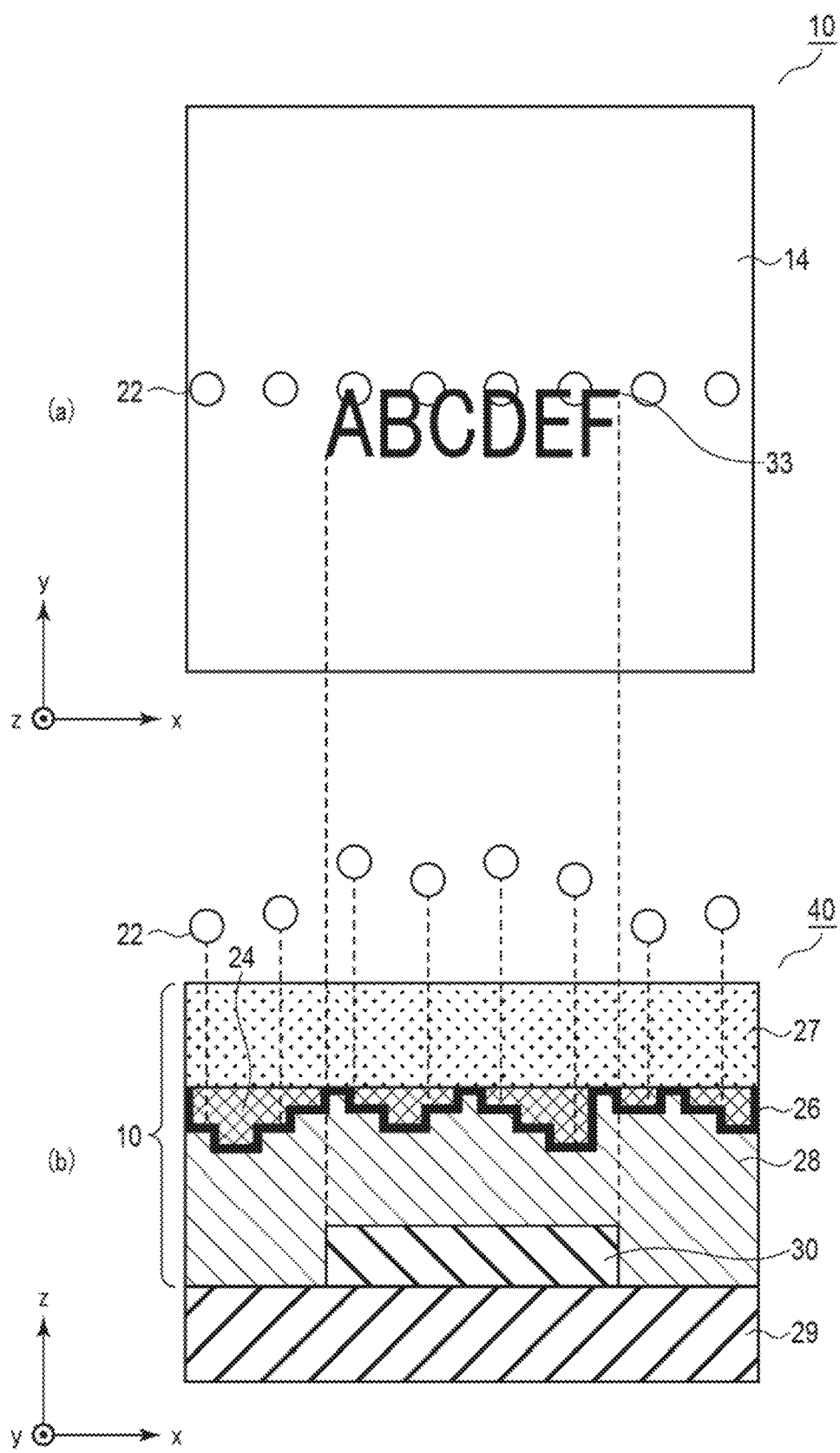
F I G. 19

| Case | θ | m |
|---|---|---|
| 1 | 10 | 9.00 |
| 2 | 20 | 4.50 |
| 3 | 30 | 3.00 |
| 4 | 40 | 2.25 |
| 5 | 50 | 1.80 |
| 6 | 60 | 1.50 |
| 7 | 70 | 1.29 |

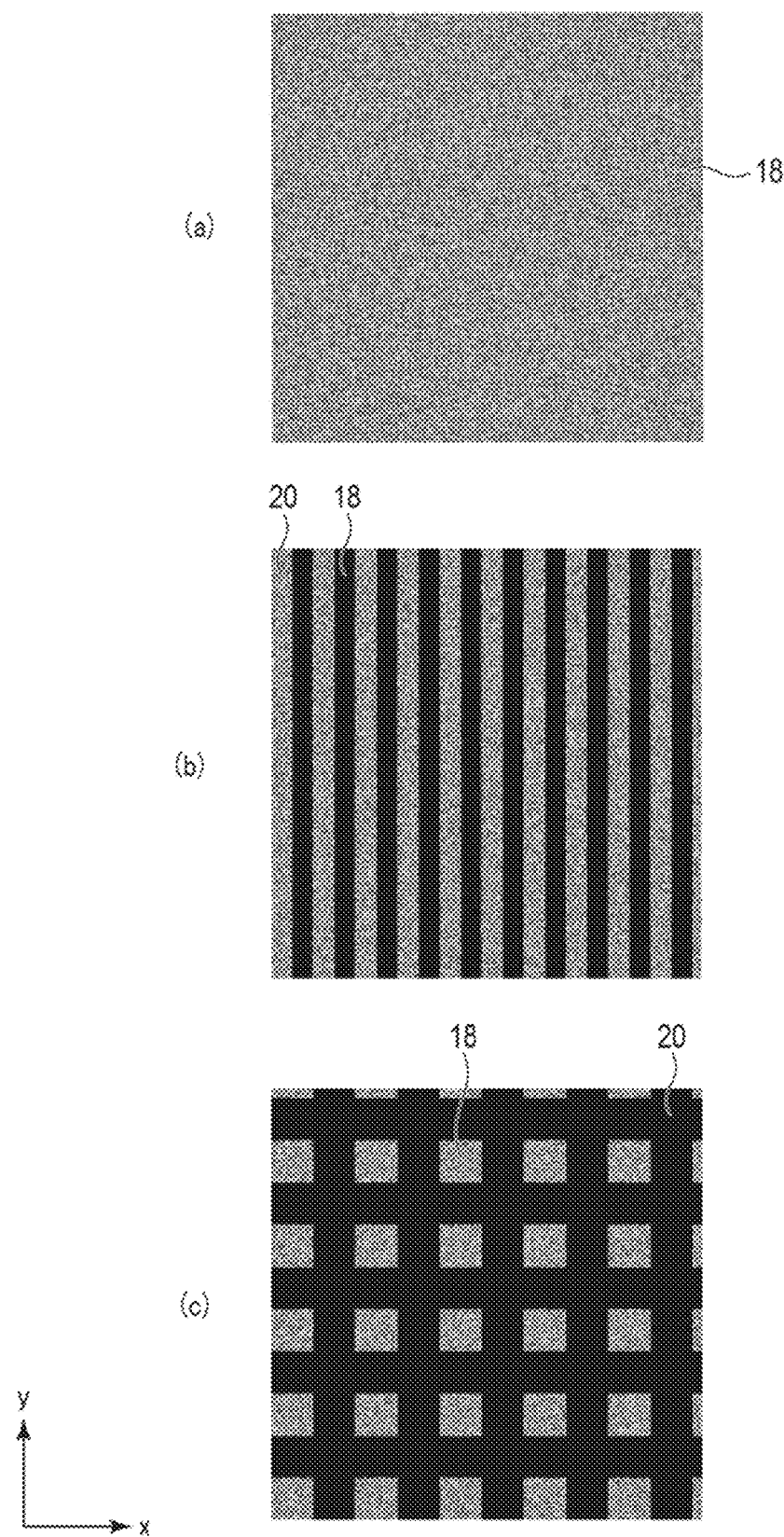
F I G. 30

| Case | Pattern | Computing time (second) |
|---|---|---|
| a | Entire surface | 4.2 |
| b | Stripe | 3.0 |
| c | Rectangle | 2.1 |
F I G. 31
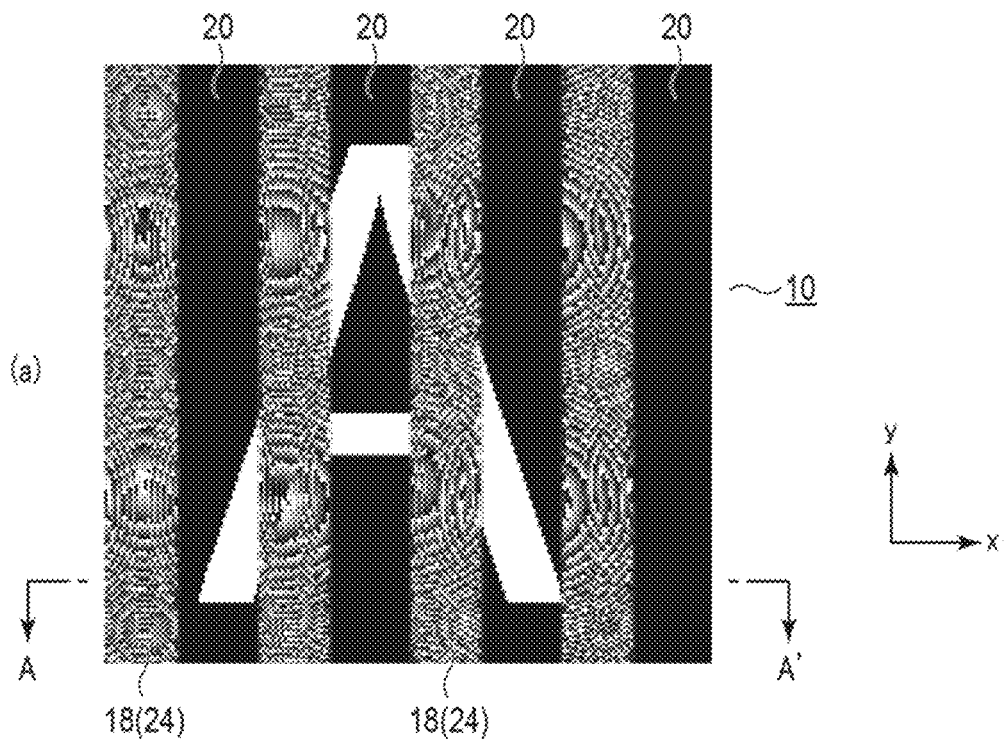
F I G. 32

OPTICAL FILM WITH RECORDING SURFACE, AND DISPLAY BODY INCLUDING OPTICAL FILM

CROSS-REFERENCE TO RELATED APPLICATION

This application is a Continuation Application of PCT Application No. PCT/JP2017/020049, filed May 30, 2017 and based upon and claiming the benefit of priority from Japanese Patent Application No. 2016-111732, filed Jun. 3, 2016, the entire contents of all of which are incorporated herein by reference.

FIELD

The present invention relates to an optical film and a display body applied to holograms, for example, for recording phase components of spatial information computed by a computing device.

BACKGROUND

In recent years, there have been prior art documents relating to computer-synthesized holograms, as cited below, showing optical films controlled based on interference of light computed by a computing device.

The examples shown in the prior art documents are those used in securities, card media, and personal authentication media. For example, Non-Patent Literature 1 discloses a method of computing light interference effect using a computing device.

Information on interference fringes is information on the intensity of the amplitude of light. In the case of recording the intensity of the amplitude of light on an optical film, the intensity of light may be reduced at the time of reconstruction depending on the recording method. Also, Patent Literature 1 and Patent Literature 2 disclose that the intensity of the interference wave of a reference light and an object light is computed to create interference fringes.

CITATION LIST

Patent Literature

Patent Literature 1: Japanese Patent No. 4256372
Patent Literature 2: Japanese Patent No. 3810934

Non-Patent Literature

Non-Patent Literature 1: Toshihiro Kubota, "Introduction to Holography," Asakura Shoten

SUMMARY

However, the aforementioned methods are computing methods premised on a reference light, and in the case of reconstructing an object light, information of the reference light defined at the time of computing is needed. Namely, only when the optical film is illuminated under the same conditions as the information of the reference light for the recording, a reconstructed image is reconstructed under the same conditions as those at the time of recording. Therefore, there is a drawback that a reconstructed image can be obtained only under the conditions restricted by the conditions of the reference light for the recording.

In regard to the computer-synthesized holograms, there have been methods for tacking individual challenges such as reduction of a computing time, production of a pattern, and combination with other optical films. However, a technology that is suited to simultaneously tackle these challenges has not been implemented.

The present invention has been made in view of the above background, and an object of the present invention is to provide an optical film that records a phase component of spatial information computed by a computing device so that a reconstructed image can be reconstructed without adopting the conditions of a reference light for recording, and provide a display body to which the optical film is attached.

In order to achieve the above object, the present invention takes the measures described below.

The invention of claim 1 is an optical film with a recording surface, the recording surface including: a computation element section in which a phase component of light from each reconstruction point of a reconstructed image is computed, the computation element section corresponding to each reconstruction point one by one; a phase angle recording area in which a phase angle computed based on the phase component is recorded; and a phase angle non-recording area in which the phase angle is not recorded, the phase angle computed based on the phase component being recorded in an overlapping area where the computation element section and the phase angle recording area overlap each other.

The invention of claim 2 is the optical film according to claim 1, wherein the phase component of light from each reconstruction point is computed for each unit block, and the phase angle computed based on the phase component is recorded in the phase angle recording area for each unit block.

The invention of claim 3 is the optical film according to claim 2, wherein the computation element section is defined by a viewing angle θ shown in an equation of θ<(A/m), where in a case of (λ/2d)≤1, A=a sin(λ/2d), λ is a wavelength of the light, d is an arrangement interval of the unit blocks in a viewing angle direction, and m is a real number of 3 or more.

The invention of claim 4 is the optical film according to claim 2, wherein the phase angle is computed from the phase component according to an equation of $$W(kx, ky) = \sum_{n=0}^{Nmax} \sum_{ky=Ymin}^{Ymax} \sum_{kx=Xmin}^{Xmax} amp \cdot \exp(i\phi)$$

$$\phi = \frac{\pi}{\lambda \cdot O_n(z)} \{(O_n(x) - kx)^2 + (O_n(y) - ky)^2\}$$

where W(kx, ky) is a phase component, n is a number of reconstruction points (n=0 to Nmax), amp is amplitude of light at a reconstruction point, i is an imaginary number, λ is a wavelength of light for reconstruction, $O_n$(x, y, z) are coordinates of the reconstruction point, (kx, ky, 0) are coordinates of the unit block, φ is a phase angle, and Xmin, Xmax, Ymin, and Ymax are coordinates defining a range of the computation element section and vary for each reconstruction point.

The invention of claim 5 is the optical film according to claim 1, wherein a machine-readable code is recorded in the phase angle recording area.

The invention of claim 6 is the optical film according to claim 1, wherein the phase angle non-recording area is a mirror surface.

The invention of claim 7 is the optical film according to claim 1, wherein information other than the phase angle is recorded in the phase angle non-recording area.

The invention of claim 8 is the optical film according to claim 7, wherein the information other than the phase angle is information including at least one of scattering, reflection, or diffraction characteristics of light.

The invention of claim 9 is the optical film according to claim 1, wherein the plural phase angle recording areas having a strip shape are periodically arranged on the recording surface to form a stripe shape.

The invention of claim 10 is the optical film according to claim 1, wherein the plural phase angle recording areas having a rectangular shape are periodically and two-dimensionally arranged to form a lattice shape.

The invention of claim 11 is the optical film according to claim 1, wherein the phase angle recording area has a shape of a figure representing a character or a pattern.

The invention of claim 12 is the optical film according to claim 11, wherein the figure is used as personal authentication information.

The invention of claim 13 is the optical film according to claim 1, wherein the plural computation element sections do not overlap each other within the phase angle recording area.

The invention of claim 14 is the optical film according to claim 1, wherein the plural reconstruction points are present on a same plane parallel to the recording surface.

The invention of claim 15 is the optical film according to claim 13, wherein each of the plurality of computation element sections not overlapping each other is colored with a different color.

The invention of claim 16 is the optical film according to claim 1, wherein the phase angle is recorded as a height of the unit block on the recording surface in the overlapping area.

The invention of claim 17 is the optical film according to claim 1, wherein a void is embedded in a corresponding unit block in the overlapping area, thereby recording the phase angle in the overlapping area, wherein a void amount of the void on the recording surface is modulated according to the phase angle.

The invention of claim 18 is a display body including the optical film according to claim 1 attached to an object.

The invention of claim 19 is the display body according to claim 18, wherein a transparent reflective layer is provided on the recording surface of the optical film.

The invention of claim 20 is the display body according to claim 18, wherein the object has a functional layer.

The invention of claim 21 is the display body according to claim 20, wherein the functional layer is a print layer.

The invention of claim 22 is the display body according to claim 20, wherein a machine-readable code is recorded in the functional layer.

According to the optical film of the invention of claim 1, it is possible to reduce a computation time by a computing device, reduce a noise of spatial information, and obtain a clear hologram, by providing a computation element section.

In this computation, only a phase angle is computed, in particular, without changing information of the amplitude of light. Therefore, only a phase component of the light is modulated, and the amplitude of the light is theoretically not modulated. As such, it is possible to control the light while maintaining high luminance without changing the brightness.

It is also possible to further reduce a computation time by a computing device by separately providing a phase angle recording area for recording a phase angle and a phase angle non-recording area not recording a phase angle. In addition, it is possible to control a proportion of light striking the optical film.

Furthermore, the brightness of a reconstructed image reconstructed at reconstruction points can be darkened by a degree of (phase angle recording area)/(phase angle recording area+phase angle non-recording area), as compared to a case where the phase angle non-recording area is not provided. Thereby, the brightness and darkness of light can be controlled.

Also, only when the phase angle recording area is irradiated with light, a hologram can be reconstructed at the reconstruction points. Namely, it is possible to reconstruct a bright reconstructed image as the phase angle recording area is larger, and it is possible to reconstruct only a dark reconstructed image as the phase angle recording area is smaller.

According to the optical film of the invention of claim 2, it is possible to compute a phase component of light from each reconstruction point for each unit block, and record a phase angle computed based on the phase component in the phase angle recording area for each unit block.

According to the optical film of the invention of claim 3, a computation element section can be specifically defined based on a viewing angle $\theta$.

According to the optical film of the invention of claim 4, a phase angle can be computed based on a phase component.

According to the optical film of the invention of claim 5, a machine-readable code can be recorded in the phase angle recording area.

According to the optical film of the invention of claim 6, the phase angle non-recording area can be a mirror surface.

According to the optical film of the invention of claim 7, it is possible to control components other than the phase component of light on the phase angle non-recording area by recording information other than the phase angle in the phase angle non-recording area.

According to the optical film of the invention of claim 8, it is possible to perform various types of light control using different light effects and achieve a complicated visual effect by setting the information other than the phase angle recorded in the phase angle non-recording area to at least one of scattering, reflection, or diffraction characteristics of light.

According to the optical film of the invention of claim 9, the computing time can be reduced, and, in particular, it is possible to prevent influence on the effect of light in the horizontal direction by setting a direction of the stripe to the vertical direction. Likewise, it is possible to prevent influence on the effect of light in the vertical direction by setting a direction of the stripe to the horizontal direction.

According to the optical film of the invention of claim 10, it is possible to control each of the effects of light applied in the horizontal direction and the vertical direction.

According to the optical film of the invention of claim 11, it is possible to give a three-dimensional dynamic effect to a character or a pattern by arranging the phase angle recording area to have a shape of a figure representing the character or the pattern.

According to the optical film of the invention of claim 12, the figure can be used as personal authentication information.

According to the optical film of the invention of claim 13, the computation element sections do not overlap each other in the phase angle recording area. Therefore, it is possible to maximize the contrast of a reconstructed image at the reconstruction points.

According to the optical film of the invention of claim 14, equalizing a distance (Z direction) between a plurality of reconstruction points and a recording surface (XY plane) and computing a phase angle for one reconstruction point allows diversion of duplication of a result of the computation to a result of computing a phase angle for another reconstruction point, leading to reduction of the computing time.

According to the optical film of the invention of claim 15, it is possible to reconstruct a reconstructed image with variation in color for each reconstruction point by printing and composing different colors for respective computation element sections.

According to the optical films of the inventions of claims 16 and 17, a reconstructed image can be reconstructed at the reconstruction points.

According to the display body of the invention of claim 18, the optical film of any one of claims 1 to 17 can be applied for a display body.

According to the display body of the invention of claim 19, a transparent reflective layer can be provided on the recording surface of the optical film.

According to the display body of the invention of claim 20, an object can have a functional layer.

According to the display body of the invention of claim 21, the functional layer can be a print layer.

According to the display body of the invention of claim 22, it is possible to record a machine-readable code in the functional layer.

BRIEF DESCRIPTION OF THE DRAWINGS

FIG. 2 is a diagram illustrating a viewing angle.

FIG. 6 is a diagram showing computation element sections defined by reconstruction points.

FIG. 7 is a diagram showing computation element sections overlapping each other.

FIG. 13 is a cross-sectional diagram (a case where a substrate, a release layer, and an adhesive layer are provided) showing an example of an optical film including a unit block having unevenness corresponding to a phase angle.

FIG. 14 is a cross-sectional diagram (a case of being transferred to an object) showing an example of a display body including a unit block having unevenness corresponding to a phase angle.

FIG. 19 is a plan view and a cross-sectional view showing an example of an optical film in which a pattern and the reconstruction points are combined.

FIG. 30 is a diagram showing the shape patterns of three cases considered in order to show the effect of reducing the computing time.

FIG. 31 is a diagram listing the conditions of the three cases.

FIG. 32 is a plan view and a cross-sectional view showing an example of an optical film in which a character is printed in the phase angle non-recording area.

DETAILED DESCRIPTION

Hereinafter, embodiments of the present invention will be described in detail with reference to the drawings. Note that the same reference symbols denote constituent elements that achieve the same or similar functions throughout all the drawings, and repetitive descriptions will be omitted.

First Embodiment

Figure 1:
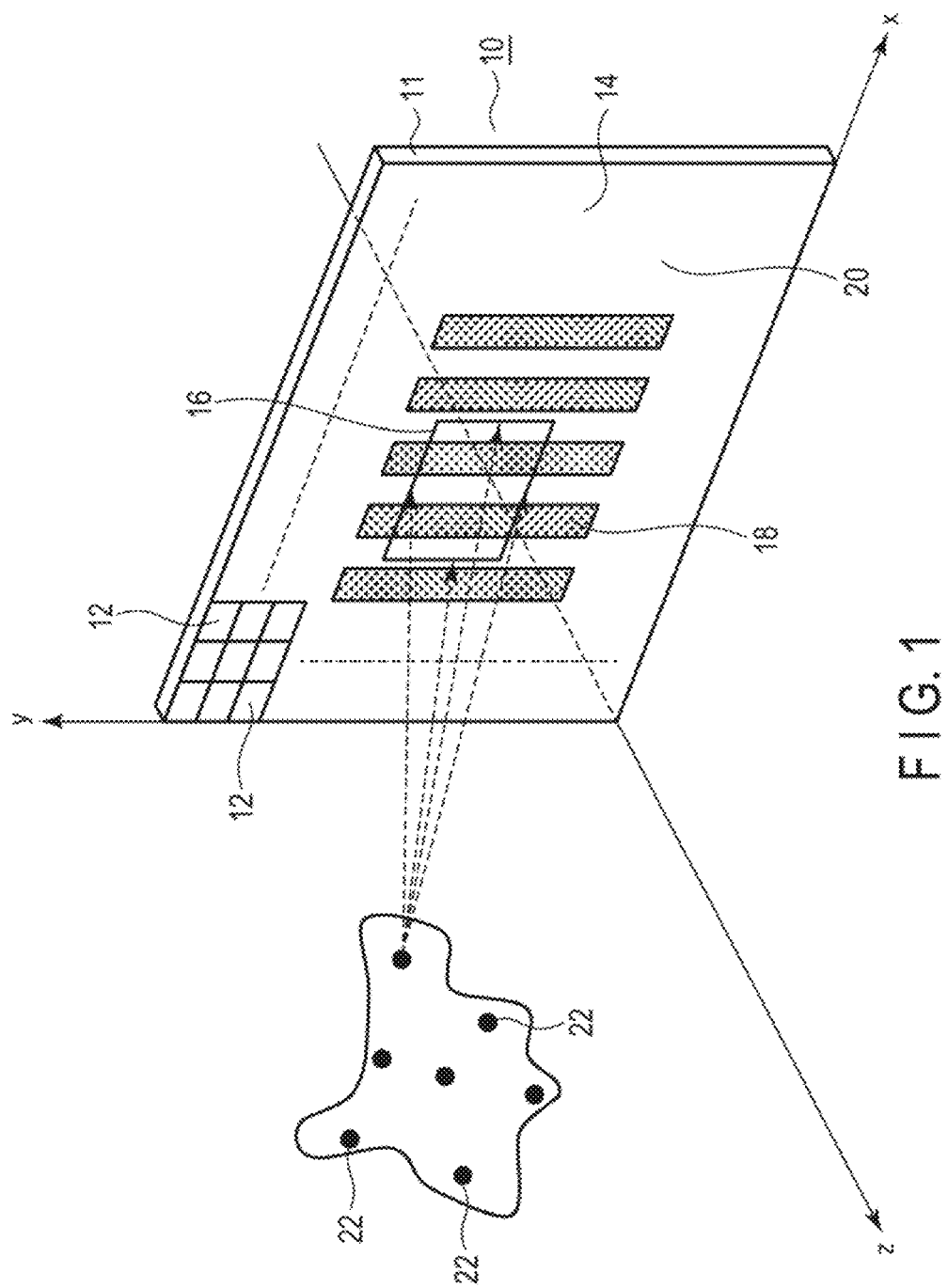
FIG. 1 is a schematic diagram illustrating an optical film according to a first embodiment of the present invention.

FIG. 1 is a schematic diagram illustrating an optical film according to a first embodiment of the present invention.

An optical film 10 according to the embodiment includes a recording surface 14. The recording surface 14 is provided on a surface of a substrate 11.

The recording surface 14 includes a phase angle recording area 18 and a phase angle non-recording area 20. On the recording surface 14, an area other than the phase angle recording area 18 is the phase angle non-recording area 20. In one example, the phase angle non-recording area 20 is a mirror surface.

FIG. 2 is a diagram illustrating a viewing angle θ when a viewing angle direction is the X direction.

On the recording surface 14, a computation element section 16 is defined in accordance with the viewing angle θ from each reconstruction point 22 where a reconstructed image is reconstructed. Since the computation element section 16 is defined independently of the phase angle recording area 18 and the phase angle non-recording area 20 as described above, the computation element section 16 usually overlaps with the phase angle recording area 18 and the phase angle non-recording area 20.

There are multiple reconstruction points 22. Therefore, in association with the respective reconstruction points 22, there is the same number of computation element sections 16 as the number of reconstruction points 22.

Also, the reconstruction points 22 are spaced apart from each other. A distance of the reconstruction points 22 from the recording surface 14 is preferably 5 mm or more and 25 mm or less. There is a case where the reconstruction points 22 are reconstructed on an observer side with respect to the recording surface 14, and a case where the reconstruction points 22 are reconstructed on a side opposite to the observer side with respect to the recording surface 14. In either case, the distance of the reconstruction points 22 from the recording surface 14 can be specified in the same manner.

The viewing angle θ from the reconstruction point 22 is defined by the following equation (1):

$$\theta < (A/m) \quad (1)$$

wherein, when $(\lambda/2d) \leq 1$, $A = a\sin(\lambda/2d)$; $\lambda$ is a wavelength of light; d is an arrangement interval of unit blocks 12 in the viewing angle direction; and m is a real number of three or more. The arrangement interval can be a center-to-center distance of unit blocks 12.

FIG. 2 illustrates a computation element section 16 specified by one reconstruction point 22. As illustrated in FIG. 2, the viewing angle θ is determined by a range in the X direction when viewing a recording surface 14 from a noted reconstruction point 22, and is half an angle 2θ formed by a minimum value Xmin in the X direction, the noted reconstruction point 22, and a maximum value Xmax in the X direction. The X direction and the Y direction correspond to the X coordinate axis and the Y coordinate axis, respectively, of Euclidean coordinates in which the right side of the recording surface 14 in the figure is the X direction and the upper side thereof is the Y direction.

A viewing angle θ in a case where the viewing angle direction is the Y direction is also specified in the same manner. Namely, the viewing angle θ is determined by a range in the Y direction when viewing the recording surface 14 from the noted reconstruction point 22, and is half an angle 2θ formed by a minimum value Ymin in the Y direction, the noted reconstruction point 22, and a maximum value Ymax in the Y direction. Therefore, the arrangement interval d of unit blocks 12 corresponds to an arrangement interval $d_X$ of the unit blocks 12 in the X direction when the viewing angle direction is the X direction; and the arrangement interval d of the unit blocks 12 corresponds to an arrangement interval $d_Y$ of the unit blocks 12 in the Y direction when the viewing angle direction is the Y direction.

Accordingly, a computation element section 16 is generally square or rectangular. However, a computation element section 16 may be a polygon other than a quadrangle, a circle, or an ellipse. In particular, a hexagon is also suitable as the polygon, in addition to a square and rectangle. When the shape of a computation element section 16 is other than a square or a rectangle, the minimum value (lower limit) in the X direction of the computation element section 16 is Xmin, and the maximum value (upper limit) in the X direction of the computation element section 16 is Xmax. Likewise, the minimum value in the Y direction of the computation element section 16 is Ymin, and the maximum value in the Y direction of the computation element section 16 is Ymax.

When a unit block 12 is square or rectangular, the shape of the unit block 12 is, in reality, a square or rectangle with rounded corners. Also, a unit block 12 may be integrated with an adjacent unit block 12. In this case, even if the shape of each unit block 12 is a square or rectangle with rounded corners, if the unit blocks 12 are integrated with each other, the integrated unit blocks 12 are deformed, not having a shape of a square or rectangle with rounded corners. However, the optical effects do not change even if the shape changes due to the integration. The unit blocks 12 are preferably arranged in an orderly manner. For an ordered arrangement, an arrangement at predetermined intervals, or an arrangement at equal intervals can be adopted. A typical ordered arrangement is a square arrangement or a hexagonal arrangement.

The viewing angle θ is less than A, as can be seen from the above equation (1). When light passes through this phase component and is diffracted, no diffraction beyond A theoretically occurs. Therefore, when hologram computation using a computing device is performed, the computation range may be limited with the viewing angle θ as the upper limit. Limiting the computation range in this manner reduces the computing time. Also, even if computation is performed for a range exceeding the viewing angle θ, the computation of the diffraction that does not theoretically exist is performed. Therefore, the result of the computation contributes only as noise. However, in the present embodiment, computation of a range exceeding the viewing angle θ is not performed. Therefore, no noise is superimposed when reconstructing a reconstructed image on the reconstruction points 22.

Both the phase angle recording area 18 and the phase angle non-recording area 20 include a plurality of unit blocks 12. A phase angle is computed by the computing device based on the phase component for the unit block 12 included in an area of the phase angle recording area 18 that overlaps with the computation element section 16 (hereinafter referred to as an "overlapping area"), and the computed phase angle is recorded in the corresponding unit block 12 included in the overlapping area. The computation of a phase angle based on the phase component will be detailed later.

However, even if the phase angle non-recording area 20 overlaps with the computation element section 16, the computation is not performed by the computing device, and the phase angle is not recorded in the phase angle non-recording area 20. Instead, information other than the phase angle, such as information on light scattering, reflection, and diffraction characteristics, is recorded in the phase angle non-recording area 20.

Figure 3:
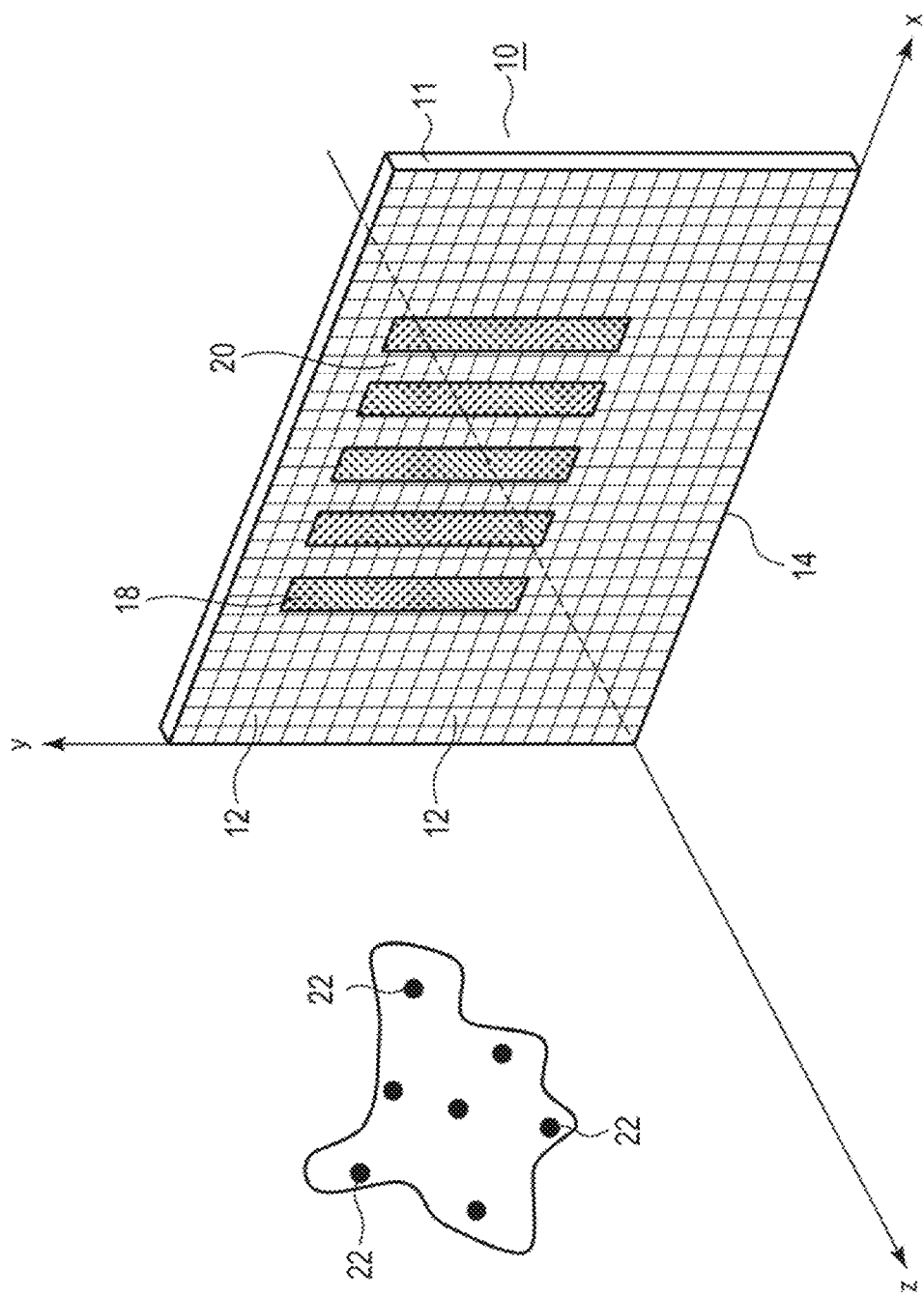
FIG. 3 is an example in which a phase angle recording area is periodically arranged on a recording surface so as to form a stripe shape.
Figure 4:
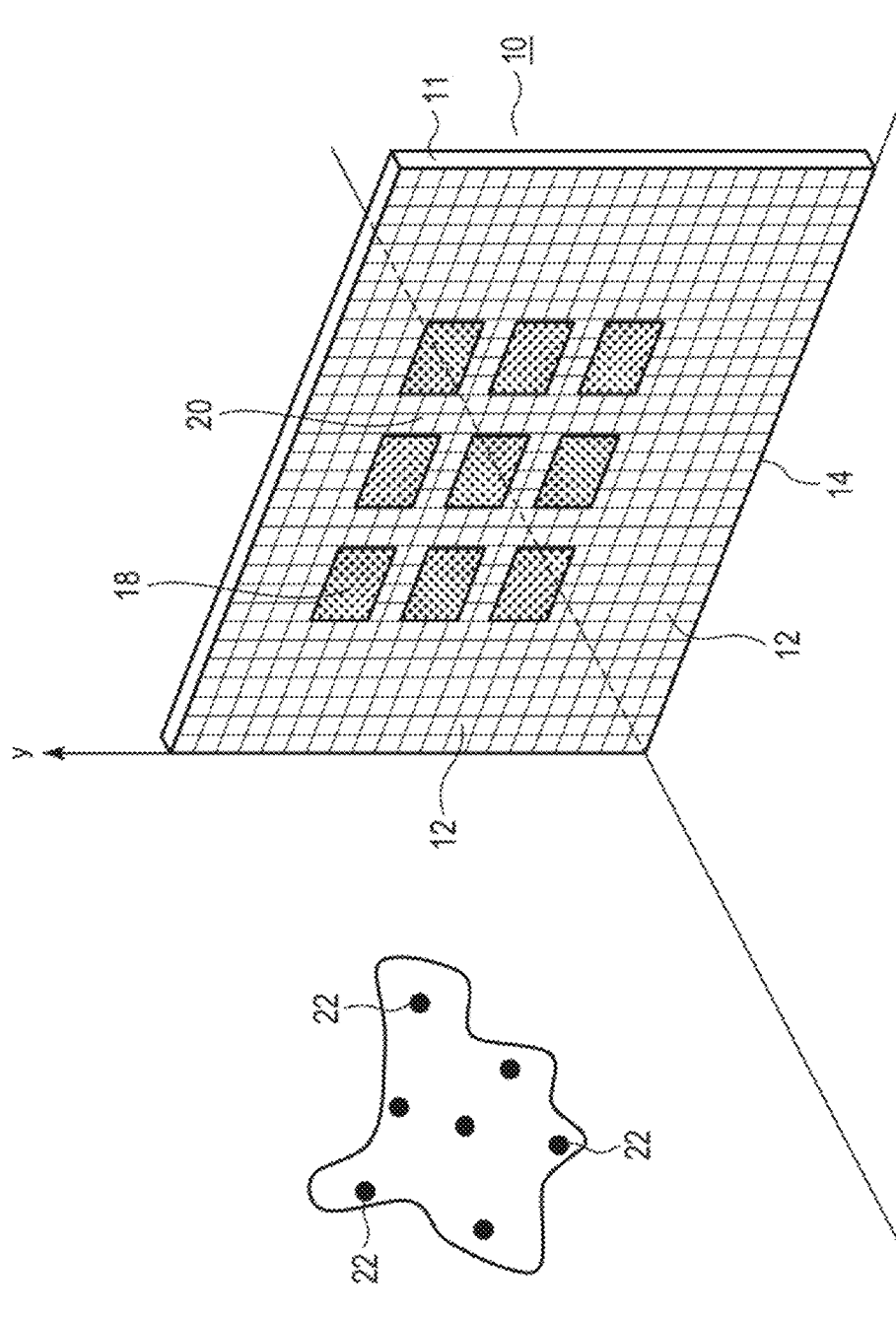
FIG. 4 is an example in which the phase angle recording area is periodically and two-dimensionally arranged on the recording surface so as to form a lattice shape.
Figure 5:
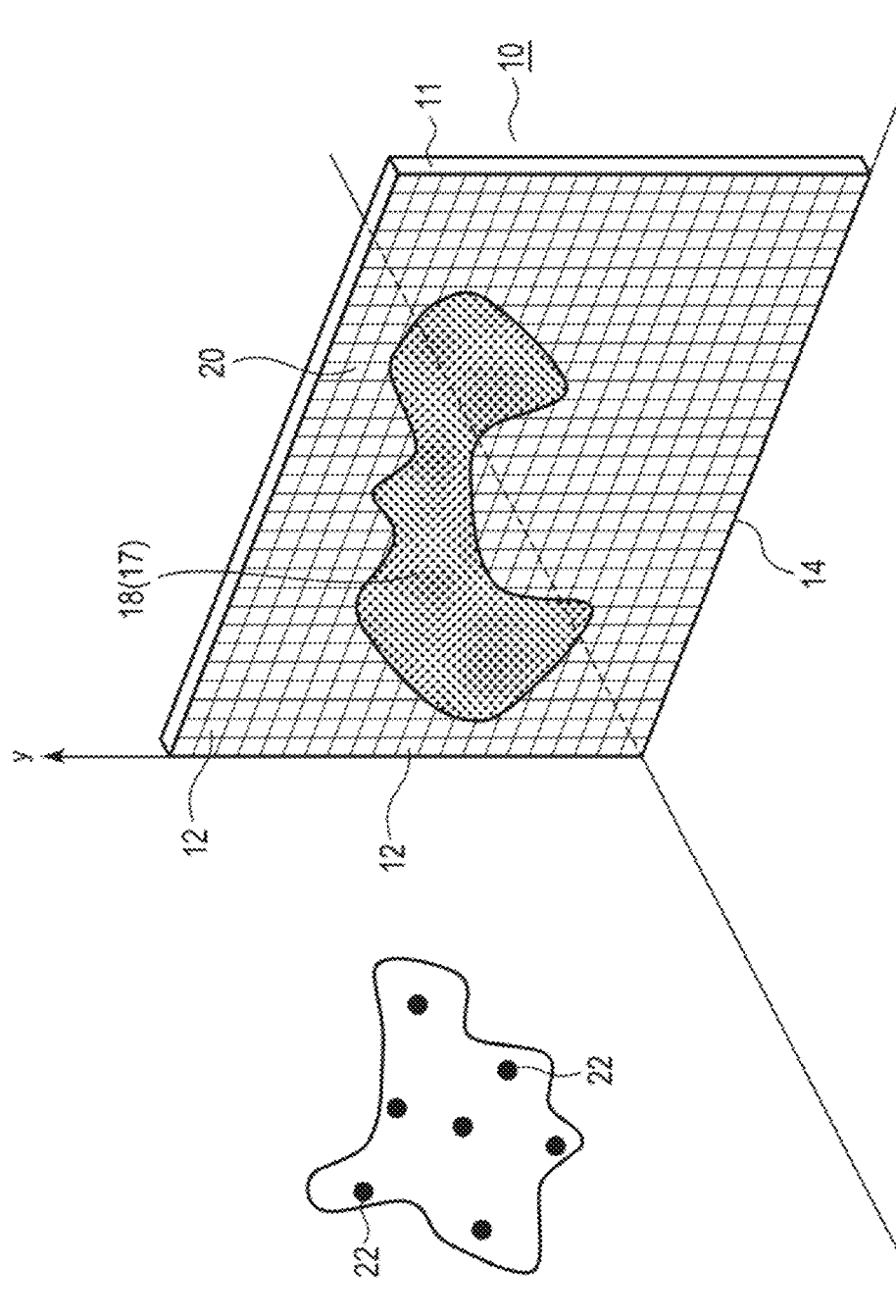
FIG. 5 is a diagram showing an example in which the phase angle recording area is configured to form a figure.

A plural phase angle recording areas 18 may be arranged on the recording surface 14, as shown in FIGS. 3 to 5. Only one phase angle non-recording area 20 is shown in FIGS. 3 to 5; however, a plural phase angle non-recording areas 20 may be arranged on the recording surface 14.

FIG. 3 shows an example in which a plural strip-shaped phase angle recording areas 18 are periodically arranged on the recording surface 14 so as to form a stripe shape.

FIG. 4 shows an example in which a plural phase angle recording areas 18 forming a rectangular shape are periodically and two-dimensionally arranged on the recording surface 14 so as to form a lattice shape.

Figure 17:
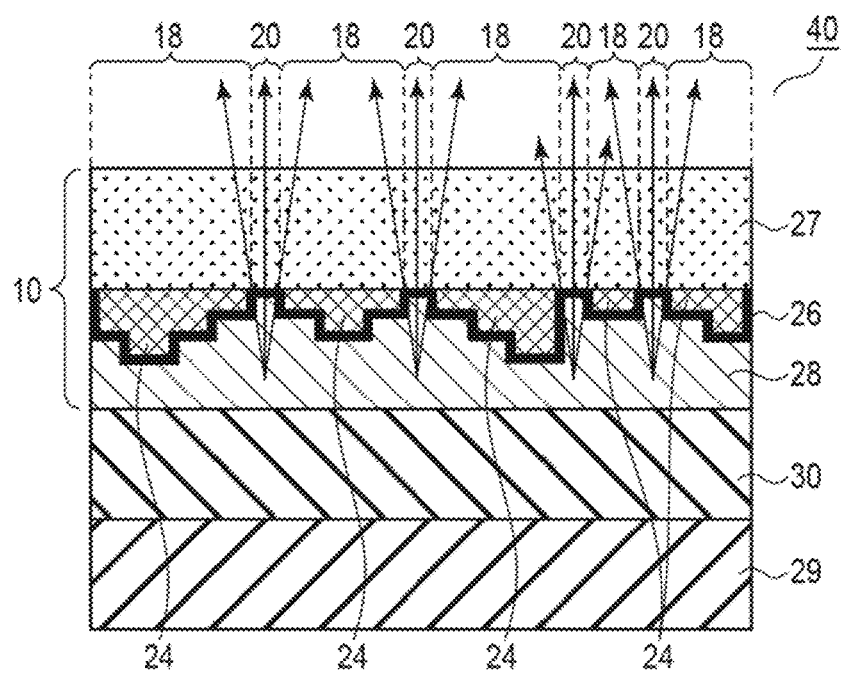
FIG. 17 is a cross-sectional view of the display body shown in FIG. 16(*b*), with clear illustration of the phase angle recording area and the phase angle non-recording area.

FIG. 5 shows an example in which a phase angle recording area 18 is arranged so as to form a FIG. 17 having a shape representing a character or a pattern.

Next, the computation of a phase angle performed by a computing device based on a phase component will be described.

A phase angle φ is computed by the computing device from a phase component W(x, y) according to the following equations (2) and (3):

$$W(kx, ky) = \sum_{n=0}^{Nmax} \sum_{ky=Ymin}^{Ymax} \sum_{kx=Xmin}^{Xmax} amp \cdot \exp(i\phi) \quad (2)$$

$$\phi = \frac{\pi}{\lambda \cdot O_n(z)} \{(O_n(x) - kx)^2 + (O_n(y) - ky)^2\} \quad (3)$$

wherein W(kx, ky) is a phase component, n is the number of reconstruction points 22 (n=0 to Nmax), amp is amplitude of light at a reconstruction point, i is an imaginary number, λ is a wavelength of light for reconstructing a hologram at the reconstruction points 22, $O_n(x, y, z)$ are coordinates of the reconstruction point 22, (Kx, Ky, 0) are coordinates of the unit block 12, φ is a phase angle, and Xmin, Xmax, Ymin, Ymax are coordinates defining a range of the computation element section 16 and vary for each reconstruction point.

In general, amp is amplitude of light at the reconstruction point 22, but it may be larger or smaller than a value of amplitude of light according to the viewing angle θ. Generally, amp can be a value greater than 0 and less than or equal to 1. For example, when the viewing angle θ is close to vertical (zero degrees), amp may be a large value (e.g., 1), and when the viewing angle θ is farther than vertical (zero degrees), amp may be a small value (e.g., 0.5). Dither processing may be performed on amp according to the viewing angle θ. Thereby, a reconstruction point 22 observed in the vertical direction is clearer than a reconstruction point 22 observed obliquely.

First, a computing device computes a phase component W(x, y) of light from a reconstruction point 22(#a) for the unit block 12 included in an overlapping area 19(#1), which is an area where a computation element section 16(#A) specified by the reconstruction point 22(#a) and a phase angle recording area 18(#1) overlap each other, and an overlapping area 19(#2-1), which is an area where the computation element section 16(#A) and a part of a phase angle recording area 18(#2) overlap each other, as illustrated in FIG. 7, for example.

There is one or more reconstruction points 22. Therefore, there is the same number of computation element sections 16 as the number of reconstruction points 22 so that the computation element sections 16 have a one-to-one correspondence with the reconstruction points 22.

If there are more than one reconstruction points 22, the computing device further computes a phase component W(x, y) of light from another reconstruction point 22(#b) for the unit block 12 included in an overlapping area 19(#2), which is an area where a computation element section 16(#B) determined by the reconstruction point 22(#b) and the phase angle recording area 18(#2) overlap each other, as illustrated in FIG. 7, for example.

As illustrated in FIG. 7, when the two computation element sections 16(#A) and 16(#B) overlap each other, the sum of the phase components W(x, y) is computed.

The computing device further computes a phase angle φ based on the computed phase component W(x, y), and records numerical information of the computed phase angle φ in the corresponding overlapping area 19.

As the number of times of recording the numerical information in the unit block 12 increases, the amount of information increases, and the computing time also increases. If the amount of information is too large, the contrast of a reconstructed image reconstructed at the reconstruction points 22 degrades. Therefore, to obtain a clearer reconstructed image, the amount of overlap and the number of times of overlapping are preferably small in regard to the portions of the multiple reconstruction points 22(#a, #b) that overlap with the phase angle recording areas 18, as in the overlapping area 19(#2-1), for example.

Therefore, if there is a plurality of computation element sections 16 on the recording surface 14, it is ideal that the plural computation element sections 16 do not overlap each other at least in the phase angle recording area 18. This will be described with reference to FIG. 8.

Figure 8:
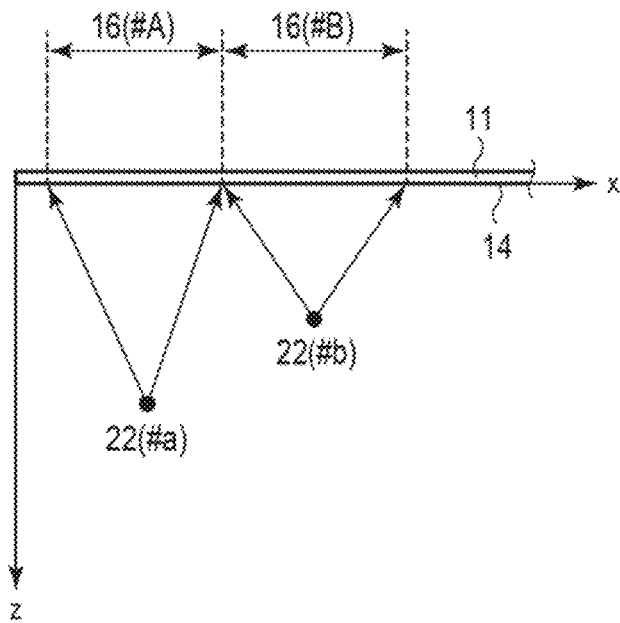
FIG. 8 is a diagram showing computation element sections not overlapping each other.

FIG. 8 is a conceptual diagram illustrating a state in which the two computation element sections 16(#A) and 16(#B) do not overlap each other. For example, if the computation element sections 16 are arranged in this manner, the plural computation element sections 16 do not overlap each other in the phase angle recording area 18. As a result, overlapping of the computation element sections 16 on a recording surface 14 is eliminated, and the contrast of a reconstructed image can be maximized. Also, eliminating the overlap of a computation element sections 16 makes it possible to reconstruct a reconstructed image with variations in color for each reconstruction point 22 by coloring and composing different colors for the respective computation element sections 16. Modulating the amplitude amp of light at a reconstruction point for each computation element section 16 can also increase the contrast of a reconstructed image. However, it should be noted that the number of reconstruction points 22 may also be limited in order to arrange the computation element sections 16 so as not to overlap each other.

Next, a function of the optical film 10 of the first embodiment of the present invention having the above-described configuration will be described.

First, when the hologram computation is performed on the optical film 10 of the present embodiment using the computing device, the upper limit of the viewing angle θ from each reconstruction point 22 is specified. In addition, the phase angle recording area 18 is provided on the recording surface 14. An area other than the phase angle recording area 18 on the recording surface 14 is the phase angle non-recording area 20.

Figure 9:
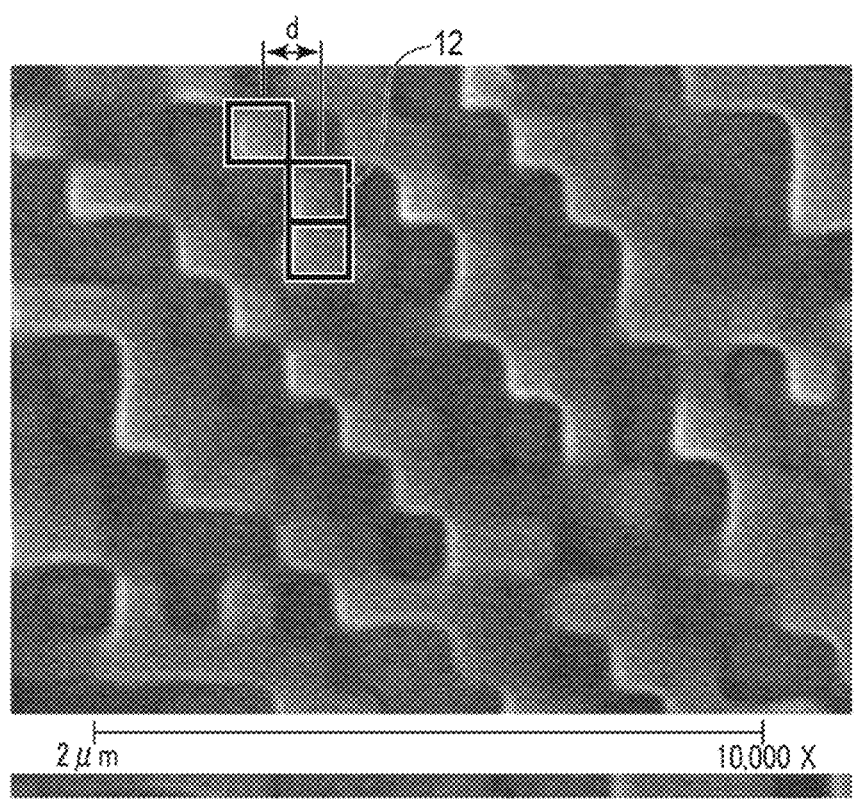
FIG. 9 is an SEM image showing an example of a unit block in which a phase angle is recorded.

A phase component W(x, y) is computed for the unit block 12 in the overlapping area 19, which is an area where the computation element section 16 defined by a viewing angle θ and the phase angle recording area 18 overlap each other, and a phase angle φ is computed from the phase component W(x, y). Since the upper limit of the viewing angle θ is specified, and the area for which the phase angle φ is computed is also limited to the overlapping area 19, as described above, the computing time is reduced. The computed phase angle φ is recorded in the corresponding unit block 12 in the overlapping area 19. FIG. 9 is an SEM image showing an example of the unit block 12 in which the phase angle φ is recorded. The unit blocks 12 shown in FIG. 9 have a square shape with a side length d, and are two-dimensionally arranged with an arrangement interval d in both the X direction and the Y direction.

As a result, only when light is applied to the phase angle recording area 18, a reconstructed image is reconstructed at the reconstruction points 22. Therefore, it is possible to switch the reconstruction at the reconstruction points 22 by controlling the way the light is applied. Also, in the present embodiment, only the phase angle φ is computed with no change in the information of the amplitude of light. That is, only the phase component W(x, y) of light is modulated, and the amplitude of light is theoretically not modulated. As such, it is possible to control light while maintaining high luminance without changing the brightness.

Moreover, since the upper limit of the viewing angle θ is specified, a range contributing as noise is not computed, so that superimposition of noise at the time of reconstructing a reconstructed image on the reconstruction points 22 is avoided, and a clearer reconstructed image can be obtained.

Furthermore, it is possible to control the brightness of a reconstructed image by changing an occupancy rate of the phase angle recording area 18 on the recording surface 14. Namely, the brightness at the time of reconstructing a reconstructed image of a hologram at the reconstruction points 22 can be darkened by a degree of (phase angle recording area)/(phase angle recording area+phase angle non-recording area), as compared to a case where the phase angle non-recording area 20 is not provided. Thereby, the brightness and darkness of light can be controlled. Only when the phase angle recording area 18 is irradiated with light is a reconstructed image reconstructed at the reconstruction points 22. Therefore, it is possible to reconstruct a bright reconstructed image as the phase angle recording area 18 is larger, and only a dark reconstructed image is reconstructed as the phase angle recording area 18 is smaller.

However, as the total size of the phase angle recording area 18 on the recording surface 14 is larger, an amount of computation by a computing device increases, and as the total size of the phase angle recording area 18 on the recording surface 14 is smaller, the computation amount is smaller. Since the brightness of a reconstructed image and the amount of computation by a computing device have a trade-off relationship, as described above, the total size of the phase angle recording area 18 on the recording surface 14 is optimally selected according to the design conditions.

In this embodiment, FIGS. 3 to 5 are shown as examples of arranging the phase angle recording area 18.

When the phase angle recording area 18 has a stripe shape extending in the vertical direction, as shown in FIG. 3, it is possible to reconstruct a reconstructed image at the reconstruction points 22 without affecting the effect of light in the stripe direction. Namely, the reconstructed image reconstructed at the reconstruction points 22 can be viewed as a continuous image when viewed from the stripe direction (the vertical direction in this case). On the other hand, if the width of the stripe is larger than the resolution of the human eye, the reconstructed image reconstructed at the reconstruction points 22 is viewed as a discontinuous image when viewed from a direction orthogonal to the stripe direction (the lateral direction in this case). In this case, however, if the width of the stripe is made to be smaller than the resolution of the human eye, it is impossible to identify whether or not there is a stripe in the appearance, so that the reconstructed image can be viewed as a continuous image. Thus, only the computing time can be reduced without affecting the human eye.

The stripe is not limited to be shaped in the vertical direction as illustrated in FIG. 3, and a reconstructed image can be reconstructed at the reconstruction points 22 with no problem even if the stripe is shaped in the horizontal direction or an oblique direction. Even if the stripe direction is the horizontal direction or an oblique direction, a reconstructed image can be viewed as a continuous image when viewed from the stripe direction, as described above. Also, when viewed from a direction orthogonal to the stripe direction, the reconstructed image can be viewed as a discontinuous image if the width of the stripe is larger than the resolution of the human eye, and the reconstructed image can be viewed as a continuous image if the width of the stripe is smaller than the resolution of the human eye.

As shown in FIG. 4, when the shape of the phase angle recording area 18 is a rectangular shape, it is not only possible to reduce the computing time but also possible to reconstruct a reconstructed image at the reconstruction points 22 while controlling the light effect in the vertical direction and the horizontal direction. Namely, according to the configuration shown in FIG. 4, the effects obtained when viewing from a direction orthogonal to the stripe direction in FIG. 3 can be obtained both in the X direction and in the Y direction. Namely, both in a view from the X direction and in a view from the Y direction, when the width of the stripe is larger than the resolution of the human eye, a reconstructed image can be viewed as a discontinuous image, and when the width of the stripe is smaller than the resolution of the human eye, a reconstructed image can be viewed as a continuous image.

If a FIG. 17 having meaning in its shape is formed by the phase angle recording area 18, as shown in FIG. 5, it is possible to give meaning and a three-dimensional dynamic effect to a reconstructed image reconstructed at the reconstruction points 22. Thus, the figure can be applied, for example, as personal authentication information.

Figure 10:
FIG. 10 is a diagram showing an example in which a reconstructed image is applied for personal authentication information.

FIG. 10 is a diagram illustrating an example in which a reconstructed image reconstructed is applied for personal authentication information.

A FIG. 17 having a shape with meaning (e.g., a name of an individual to be used, a face photograph, etc.) is formed in the phase angle recording area 18. To be precise, the dotted line portion of the FIG. 17 corresponds to the phase angle recording area 18, and the eye and mouth portions of the mark in the FIG. 17 correspond to the phase angle non-recording area 20. Accordingly, a reconstructed image corresponding to the FIG. 17 is reconstructed at the reconstruction points 22 on a personal authentication medium 31, such as an identification card. The reconstructed image is visible. With the reconstructed image, it is possible to reconstruct not only a pattern, but also a character.

On the other hand, in the present embodiment, information other than the phase angle φ may be recorded in the phase angle non-recording area 20. The information other than the phase angle φ is, for example, at least one of scattering, reflection, or diffraction characteristics of light, and by adding different light effects in this way it is possible to perform light control by various types of components other than the phase component of light, and to realize a complicated visual effect.

Also, the present embodiment does not exclude the case where a plural computation element sections 16 (e.g., computation element sections 16(#A), 16(#B)) overlap each other in the same phase angle recording area 18, as illustrated in FIG. 7. However, if a plural computation element sections 16 (e.g., computation element sections 16(#A), 16(#B)) do not overlap each other, as illustrated in FIG. 8, the contrast of a reconstructed image can be maximized when a hologram is reconstructed at the reconstruction points 22.

Figure 11:
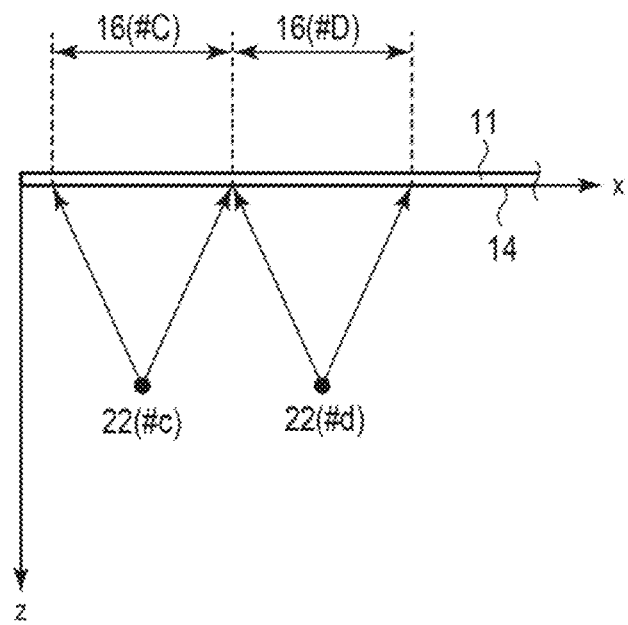
FIG. 11 is a diagram illustrating a plurality of reconstruction points with equal distances to the recording surface.

Also, the present embodiment does not exclude the presence of a plurality of reconstruction points 22 (e.g., reconstruction points 22(#a), 22(#b)) having different distances (Z direction) to the recording surface (XY plane), as shown in FIGS. 6 to 8. However, providing a plurality of reconstruction points 22 (e.g., reconstruction points 22(#c), 22(#d)) having the same distance (Z direction) to the recording surface 14 (XY plane), as illustrated in FIG. 11, makes it possible to equalize the phase angle φ for these reconstruction points 22 (e.g., reconstruction points 22(#c), 22(#d)). As a result, computing a phase angle φ for one reconstruction point 22 (e.g., reconstruction point 22(#c)) makes it possible to divert duplication of a result of the computation to computation of a phase angle φ for another reconstruction point 22 (e.g., reconstruction point 22(#d)), leading to reduction of the computing time.

In addition, according to the optical film 10 of the present embodiment, it is possible to reconstruct a reconstructed image with variations in color for each reconstruction point 22 by coloring and composing different colors for the respective computation element sections 16.

Second Embodiment

In the first embodiment, the case of recording the numerical information of the corresponding phase angle φ in the unit block 12 in the overlapping area 19 is described. In the optical film 10 according to the present embodiment, instead of recording the numerical information of the phase angle φ in the unit block 12 in the overlapping area 19, the computing device converts the phase angle φ to a height of the unevenness of the corresponding unit block 12 and forms the unevenness having the height corresponding to the phase angle φ in the unit block 12 of the overlapping area 19, thereby recording the phase angle φ in the unit block 12 of the overlapping area 19.

Figure 12:
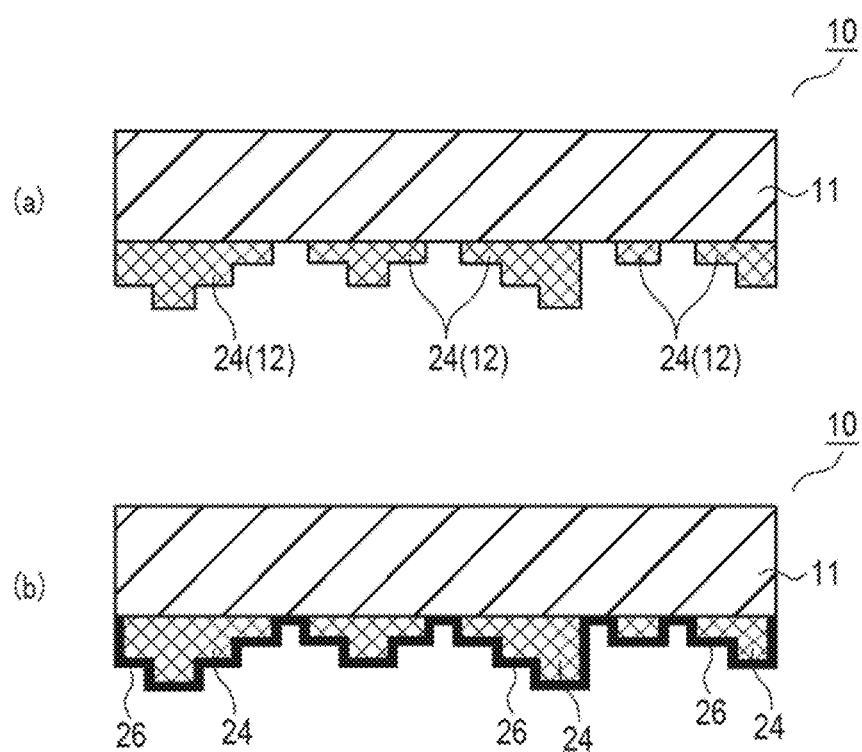
FIG. 12 is a cross-sectional diagram showing an example of an optical film including a unit block having unevenness corresponding to a phase angle.

FIG. 12 is a cross-sectional diagram showing an example of the optical film 10 including the unit block 12 having unevenness corresponding to the phase angle cp.

When converting the phase angle φ to a height of the unevenness, the computing device computes a phase angle φ in the range of 0 to 2 π, and further converts it to an 8-bit grayscale value to output the computation result to an image. In this case, 2 π corresponds to an 8-bit grayscale value of 255. Thereafter, drawing is performed on a resist substrate by an electron beam drawing machine based on the computation result.

If the electron beam drawing machine cannot handle multi-level drawing, drawing with different powers may be performed in the same area in multiple stages to thereby implement close drawing to multi-level drawing. By drawing three times, multiple levels of eight can be expressed. Thereafter, development processing and electroforming processing of the resist are performed. When drawing on the resist substrate, it is preferable to record phase angles in four levels or eight levels. In particular, four levels are suitable in view of processing.

The phase angle φ can be recorded by modulating the dose amount of an electron beam. The depth of the resist varies with the dose amount. By this depth, the phase angle φ can be recorded on the recording surface.

An original plate is used to form unevenness on a phase angle recording layer 24 provided to face the substrate 11 using a thermoplastic resin, thermosetting resin, UV resin, etc., as shown in FIG. 12(a), for example. In this manner, the unit block 12 having unevenness corresponding to the phase angle φ is obtained.

Also, when observing a reflected light, a surface of the phase angle recording layer 24 may be coated with a reflective layer 26, as shown in FIG. 12(b). When observing only a transmitted light without observing a reflected light, the surface of the phase angle recording layer 24 need not be coated with the reflective layer 26, as shown in FIG. 12(a).

In the above description, an example is shown in which the unit block 12 having unevenness corresponding to the phase angle φ is formed using an original plate. However, as another method, it is possible to expose and develop a silver halide exposure material, and change the developed silver after bleaching into a silver salt, such as silver halide, to make it transparent. Alternatively, a thermoplastic or the like which changes its refractive index or surface shape by light may be used.

FIG. 13, which is an application of FIG. 12, is a cross-sectional view of the optical film 10 configured so that a release layer 27 is stacked on the substrate 11, the phase angle recording layer 24 is further stacked on the release layer 27, an adhesive layer 28 is further stacked on the phase angle recording layer 24, as appropriate, and the optical film 10 is attachable to an object by the adhesive layer 28. FIG. 13(a) and FIG. 13(b) correspond to FIG. 12(a) and FIG. 12(b), respectively. FIG. 13(a) is a cross-sectional diagram illustrating a configuration example of the optical film 10 in which the phase angle recording layer 24 is not coated with the reflective layer 26; and FIG. 13(b) is a cross-sectional diagram illustrating a configuration example of the optical film 10 in which the phase angle recording layer 24 is coated with the reflective layer 26.

FIG. 14(a) and FIG. 14(b), which correspond to FIG. 13(a) and FIG. 13(b), respectively, are cross-sectional diagrams showing configuration examples of a display body 40 including the optical film 10 in which the substrate 11 has been released from the release layer 27 after the optical film 10 was transferred to an object 29 via the adhesive layer 28.

A material applied for the substrate 11 may be a rigid material such as a glass substrate, or may be a film substrate. For example, a plastic film such as PET (polyethylene terephthalate), PEN (polyethylene naphthalate), or PP (polypropylene), can be used, but it is preferable to use a material with little deformation or transformation due to heat, pressure, etc., applied when providing the phase angle recording layer 24. Paper, synthetic paper, plastic multilayer paper, resin-impregnated paper, etc., may be used as the substrate 11 depending on the use and purpose.

A resin and a lubricant can be applied for the release layer 27. A thermoplastic resin, a thermosetting resin, an ultraviolet curable resin, an electron beam curable resin, etc., are suitably employed as the resin. The resin is an acrylic resin, polyester resin, or polyamide resin. Also, waxes such as polyethylene powder, paraffin wax, silicone, and carnauba wax are suitably employed as the lubricant. They are formed as the release layer 27 on the substrate 11 by a known coating method such as a photogravure printing method or a micro-gravure method. The thickness of the release layer 27 is preferably in the range of 0.1 µm to 2 µm, for example.

A resin can be applied for the phase angle recording layer 24. A thermoplastic resin, a thermosetting resin, an ultraviolet curable resin, a thermoformable material having a radically polymerizable unsaturated group, an electron beam curable resin, etc., are suitably employed as the resin. A thermoplastic resin of polyvinyl chloride resin, urethane resin, polycarbonate resin, polystyrene resin, unsaturated polyester resin, melamine resin, epoxy resin, urethane (meth)acrylate, polyester (meth)acrylate, epoxy (meth)acrylate, polyol (meth)acrylate, melamine (meth)acrylate, or triazine (meth)acrylate is used as the resin. The thickness of the phase angle recording layer 24 is preferably in the range of 0.5 µm to 5 µm, for example.

The reflective layer 26 is formed using, for example, ink. The ink used may be an offset ink, letterpress ink, photogravure ink, etc., depending on the printing method, and a resin ink, oil-based ink, and water-based ink, for example, may be employed depending on the composition. Also, an oxidation polymerizable ink, penetration drying ink, evaporation drying ink, and ultraviolet curable ink, for example, may be employed depending on the drying method.

As an example of a material of the reflective layer 26, a functional ink which varies color depending on the illumination angle or observation angle may be used. Examples of such functional ink include an optically variable ink, a color shift ink, and a pearl ink.

An inorganic compound is also used as a material of the reflective layer 26. Metal compounds, such as $TiO_2$, $Si_2O_3$, SiO, $Fe_2O_3$, and ZnS, are suitably employed as the inorganic compound. Inorganic compounds have a high refractive index and are easy to increase reflectance. Also, metal is used as a material of the reflective layer 26. Al, Ag, Sn, Cr, Ni, Cu, and Au may be employed as the metal. The reflective layer 26 using an inorganic compound and a metal can be formed by a vapor-phase deposition method. Vapor deposition, CVD, and sputtering may be employed as the vapor-phase deposition method. The thickness of the reflective layer 26 may be 40 nm or more and 1000 nm or less. The reflectance of the reflective layer 26 is preferably 30% or more and 70% or less. If it is 30% or more, sufficient reflection can be achieved even if there is an underlying print layer. If the reflectance is higher than 70%, it becomes difficult to observe the underlying print layer.

The display body 40 shown in FIG. 14 is configured by attaching the optical film 10 to the object 29. The object 29 is a banknote, coupon, stamp, card, signage, poster, tag, seal, or the like. As long as the adhesive layer 28 can be adhered tightly to the object 29, the adhesive layer 28 may be made of any material, and may be, for example, an adhesive.

The object 29 is not particularly limited as long as it is an object, such as paper and polymer, which can be attached via the adhesive layer 28.

Also, a protective layer (not shown in the drawings) may be provided on a surface of the display body 40 because blurring occurs in a reconstructed image if it is easily scratched by friction, etc. The protective layer can also provide hard coat properties. The hard coat properties may be the hardness of H or more and 5 H or less in the pencil hardness test (JIS K5600-5-4).

It is preferable that the 20° gloss))(Gs(20° of the surface of the display body 40 be 15 or more and 70 or less. If the 20° gloss))(Gs(20° is less than 15, the anti-glare property becomes strong, and the reconstruction points 22 do not form an image well. On the other hand, if the 20° gloss))(Gs(20° exceeds 70, a reflected light appears on a reconstructed image due to insufficient anti-glare properties, making it difficult to capture and observe the reconstructed image. The 20° gloss))(Gs(20° is more preferably in the range of 20 to 60.

Also, the value of the transmitted image definition (C(0.125)+C(0.5)+C(1.0)+C(2.0)) of the phase angle recording layer 24 is preferably 200% or more. In addition, the haze (Hz) of the phase angle recording layer 24 can be 1.0% or more and 25% or less. The 20° gloss was measured according to JIS-K7105-1981 using a gloss meter (micro-TRI-gloss manufactured by BYK-Gardner). The transmission definition was measured according to JIS-K7105-1981 using a mapping measuring device (trade name: ICM-1DP, manufactured by Suga Test Instruments Co., Ltd.).

A light passing through an anti-glare film is determined by computation based on an equation of $C=(M-m)/(M+m)\times 100$ from a maximum wavelength M and a lowest wavelength m measured through a moving optical comb. The larger the value of the transmitted image definition C (%) is, the clearer and the better the image is. Since optical combs with four different widths (0.125 mm, 0.5 mm, 1.0 mm, 2.0 mm) are applied for the measurement, the maximum value is 100%×4=400%.

The haze (Hz) was measured according to JIS-K7105-1981 using a haze meter (NDH2000 manufactured by Nippon Denshoku Industries Co., Ltd.).

The totallight reflectance can be measured according to JIS-K 7105, for example, using a spectrophotometer U-4100 manufactured by Hitachi High-Technologies Corporation and an integrating sphere.

Figure 15:
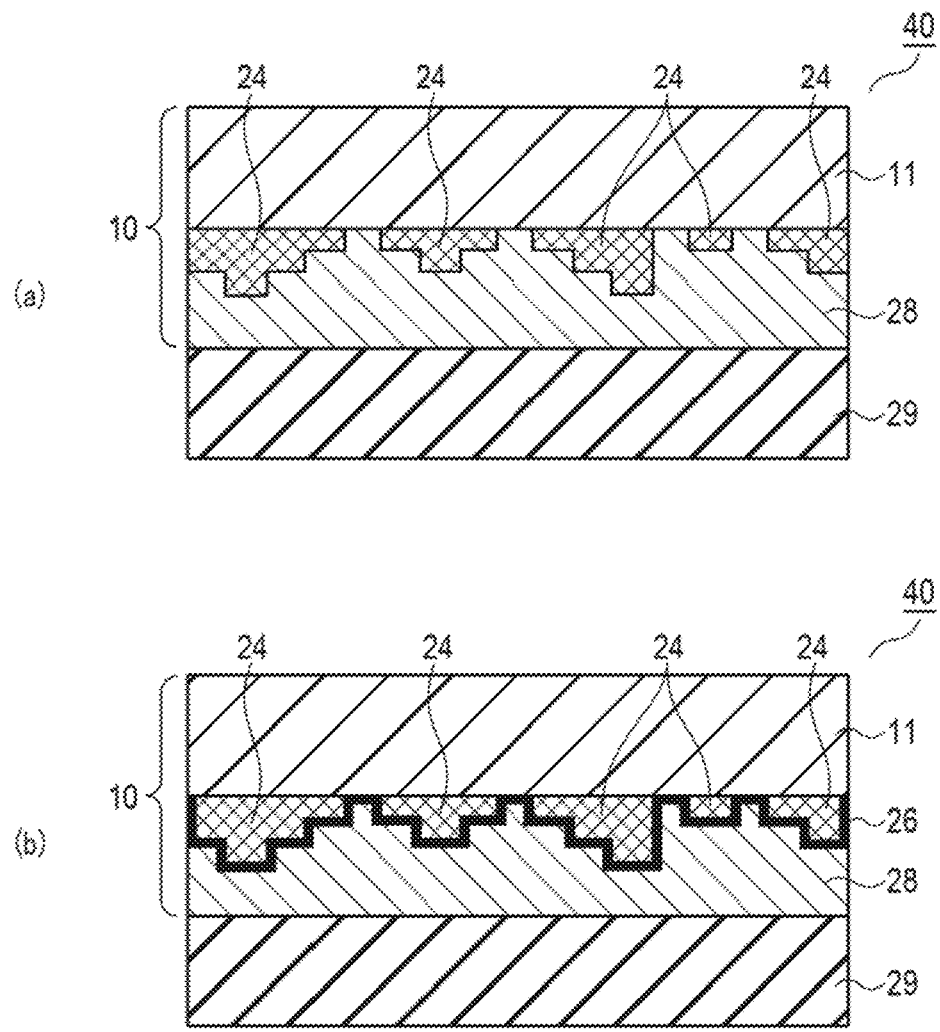
FIG. 15 is a cross-sectional diagram (a case of being transferred to an object together with a substrate) showing an example of the display body including a unit block having unevenness corresponding to a phase angle.

As a modification, an optical film 10 having no release layer 27 and having the phase angle recording layer 24 directly stacked on the substrate 11 can also be provided. FIGS. 15(a) and 15(b) are cross-sectional diagrams respectively showing a configuration example of a display body 40 in which such an optical film 10 is attached to the object 29. In this case, since the optical film 10 has no release layer 27, the substrate 11 remains even after the optical film 10 is attached to the object 29, as shown in FIGS. 15(a) and 15(b).

When the substrate 11 forms a print layer, matted paper is preferably used. Examples of the matted paper include high quality paper, medium quality paper, matte-coated paper, and art paper.

Figure 16:
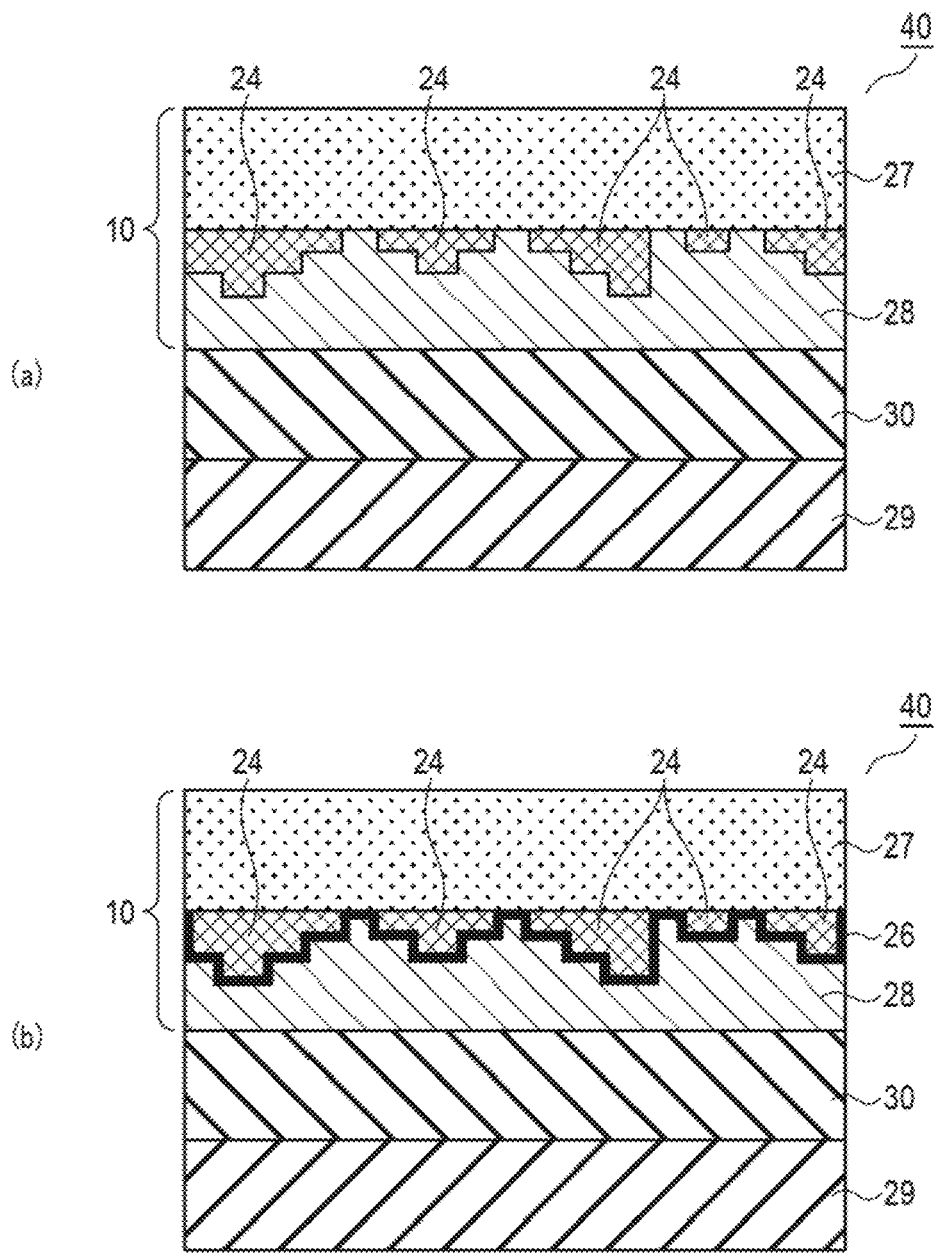
FIG. 16 is a cross-sectional diagram (a case where an object has a functional layer) showing an example of the display body including a unit block having unevenness corresponding to a phase angle.

In addition, the object 29 may have a functional layer 30, as shown in FIG. 16, to possess in advance characteristics having light scattering, reflection, or diffraction characteristics. FIGS. 16(a) and 16(b) are cross-sectional diagrams respectively showing a configuration example of the display body 40 in which the object 29 has the functional layer 30, and corresponds to FIGS. 14(a) and 14(b), respectively.

In the case of the configuration shown in FIG. 16(b), the reflective layer 26 is preferably formed of a thin film so as to transmit light, whether the forming material is a light-transmitting material or a material having no light-transmitting properties. Thereby, both the optical effect by the reflective layer 26 and the optical effect by the functional layer 30 can be simultaneously produced.

The functional layer 30 of the object 29 includes a fine nanostructure, a diffraction grating structure, a microstructure, and a print layer. As a simple example, the functional layer 30 part is a print layer, and a functional layer having a transparent reflective layer is attached to the surface of the print layer via the adhesive layer 28. Thereby, both the optical effect of the functional layer 30 and the optical effect by the print of the functional layer 30 can be produced. The print layer may be formed using ink.

A pigment ink and a dye ink may be applied for the ink. Inorganic compounds and organic substances may be applied for the pigment ink. The inorganic pigment includes graphite, cobalt, and titanium. The organic pigment includes phthalocyanine compounds, azo pigments, and organic complexes. Fluorescent or phosphorescent pigments may also be used. The pigment can be dispersed to a polymer matrix and printed to form a print layer. Acrylic resin, urethane resin, rosin, and the like may be used as the polymer matrix. The amount of adding the pigment is preferably 0.1% or more and 10% or less. An organic substance may be applied for the dye ink. The organic dye includes a natural dye and a synthetic dye. Examples of the synthetic dye include azo dyes and organic complex dyes. A fluorescent or phosphorescent dye may also be used. The dye can be dispersed to a polymer matrix and printed to form a print layer. Acrylic resin, urethane resin, rosin, and the like may be used as the polymer matrix. The amount of adding the dye is preferably 0.5% or more and 30% or less.

In order to improve the discrimination of a reconstructed image, it is preferable that the print layer have low reflection. Typically, low reflection means that a reflectance of all light rays is 1% or more and 29% or less. If the Munsell brightness is 1 to 6, a natural color tone is generated, and the corresponding total light reflectance is 1% or more and 29% or less.

A difference between the arrangement interval of the computation element sections 16 and the interval of the halftone dots of the print layer is preferably 3 times or more and 10 times or less, or ⅓ or less and 1/10 or more. Thereby, moiré between the computation element sections 16 and the halftone: dots of the print layer does not occur.

When the reflective layer 26 is provided in the phase angle recording area 18, and the reflective layer 26 is not provided in the phase angle non-recording area 20, as shown in FIG. 17, which clearly shows the phase angle recording area 18 and the phase angle non-recording area 20 added to FIG. 16(b), light passes through the phase angle non-recording area 20. Therefore, in this case, the optical effect of the functional layer 30 of the object 29 can be produced, irrespective of the material and the film thickness of the reflective layer 26.

Figure 18:
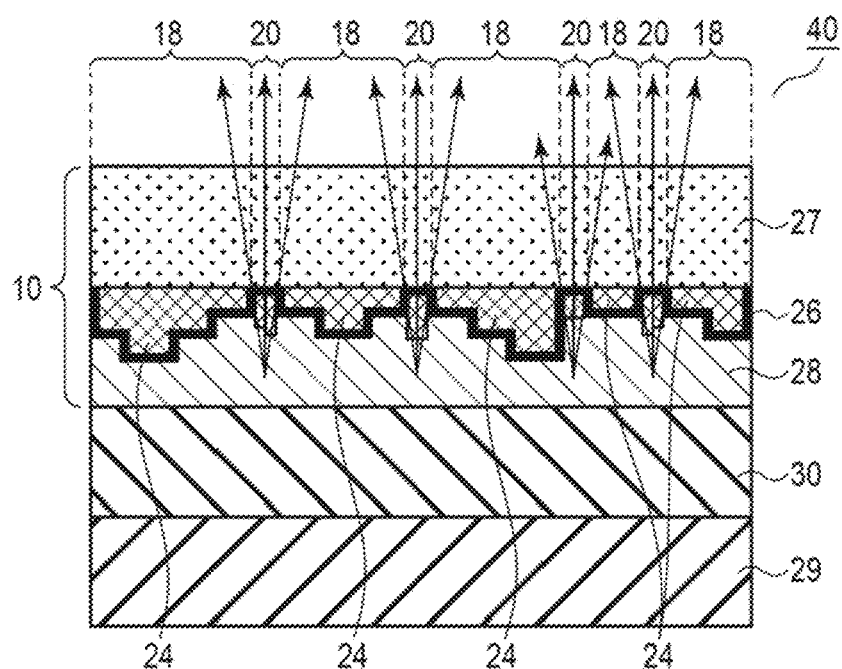
FIG. 18 is a cross-sectional diagram (a case where the functional layer is on the entire surface) showing an example of the display body including a unit block having unevenness corresponding to a phase angle.

FIG. 18, which is a partial modification of FIG. 17, is a cross-sectional diagram showing a configuration example in which the phase angle recording layer 24 is on the entire surface by also placing the phase angle recording layer 24 in a place where the phase angle recording layer 24 is not placed in FIG. 17.

Even if the phase angle recording layer 24 is on the entire surface, as shown in FIG. 18, the optical effect can be produced by providing a portion having the reflective layer 26 and a portion without the reflective layer 26. It is possible to create a portion with and a portion without the reflective layer 26 by providing a print layer to a portion without the reflective layer 26, providing the reflective layer 26 on the entire surface by vapor deposition, sputtering, printing, etc., and thereafter removing the print layer provided to the portion without the reflective layer 26.

It is also possible to produce an effect of highlighting a printed pattern (ABCDEF) 33 by combining the printed pattern 33 of the functional layer 30 of the object 29 and the spaced reconstruction points 22, and thereby changing the depth of reconstruction of the reconstruction points 22 in accordance with the printed pattern 33, as shown in FIG. 19. In particular, since it is desired to highlight the pattern 33 at the part where the pattern 33 is provided, the reconstruction points 22 are reconstructed at a distance from the print surface, as shown in FIG. 19(b), which is a cross-sectional diagram corresponding to the plan view of FIG. 19(a), thereby clearly distinguishing a reconstructed image at the reconstruction points 22 from the printed pattern 33 and making it easy for an observer to visually identify the pattern 33.

In contrast, bringing the reconstruction points 22 close to the print surface at a part without the pattern 33, as shown in FIG. 19(b), can make the reconstruction points 22 clear to the observer. The effect of highlighting the pattern 33 can also be produced by making the distance of the reconstruction point 22 from the print surface opposite to that described above. It is also possible to achieve such an effect by, for example, making the reconstruction point 22 coarse only at the part where the pattern 33 is provided, and making the reconstruction point 22 dense only at the part without the pattern 33. Examples of the function of the functional layer 30 of the object 29 include not only printing, but also fine nanostructures, diffraction grating structures, microstructures, and computer-generated holograms.

Figure 20:
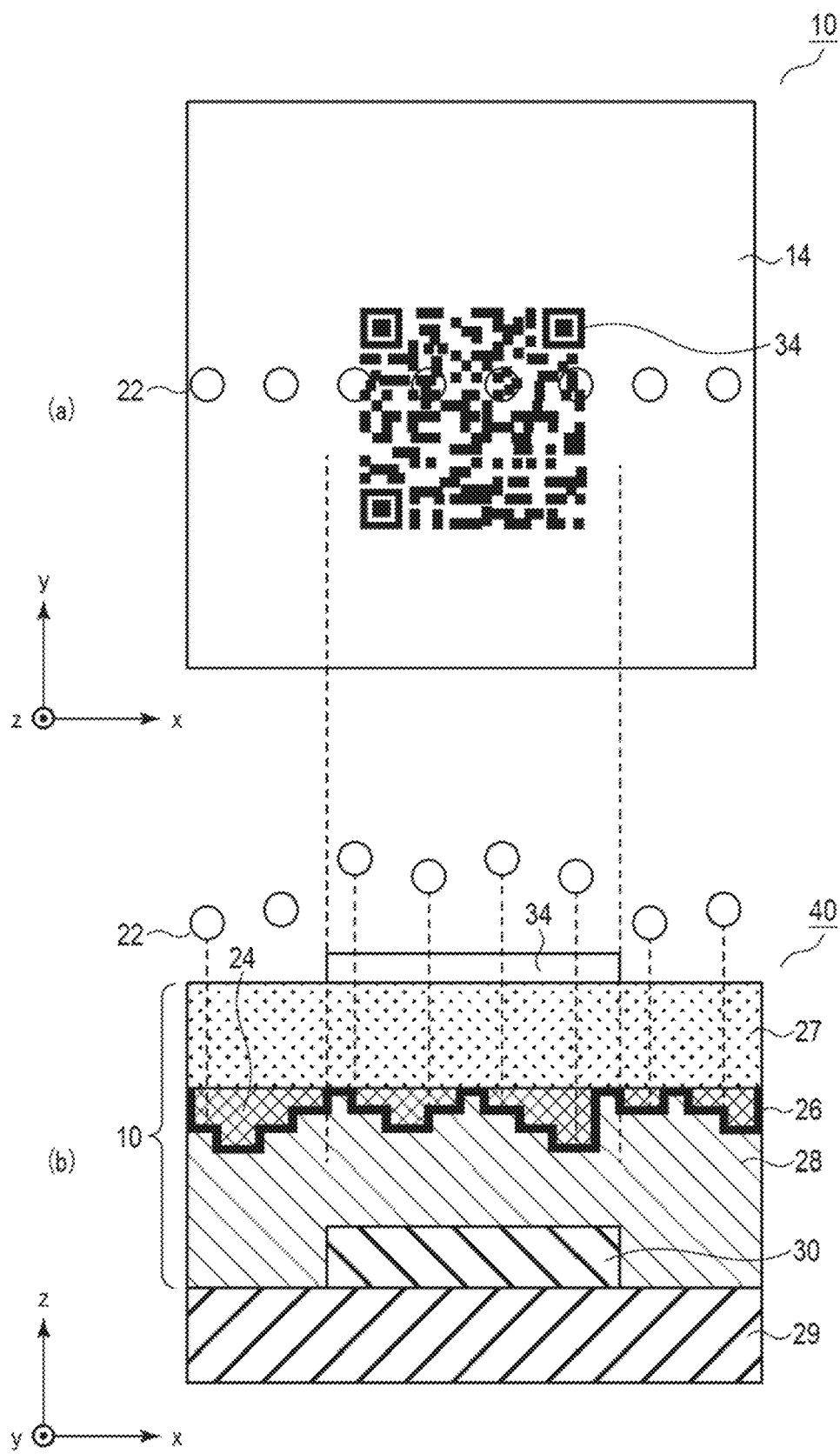
FIG. 20 is a plan view and a cross-sectional view showing an example of an optical film in which a machine-readable code and the reconstruction points are combined (a case where a machine-readable code is recorded in the functional layer).

A machine-readable code may be recorded in the functional layer 30, as shown in FIG. 20. The machine-readable code includes a QR code (registered trademark), iQR code, AR code, and digital watermark.

Even if a machine-readable code 34 is arranged in the functional layer 30, as shown in FIG. 20, the machine-readable code 34 is highlighted and read by a code reader by changing the depth of reconstruction of the reconstruction points 22 according to the arrangement of the machine-readable code 34. In particular, to improve the readability of the machine-readable code 34, the reconstruction points 22 are reconstructed at a distance from the machine-readable code 34 in the portion where the machine-readable code 34 is arranged, as shown in FIG. 20(b), which is a cross-sectional view corresponding to the plan view of FIG. 20(a), thereby clearly distinguishing a reconstructed image at the plurality of reconstruction points 22 from the machine-readable code 34, and making the machine-readable code 34 easily readable by the code reader.

Also, the machine-readable code 34 is preferably provided in the phase angle recording area 18. If the machine-readable code 34 is printed on a normal printed material, a sense of incompatibility arises. However, a reconstructed image that changes depending on the lighting and the observation angle makes it hard to recognize, and can hide the machine-readable code 34 on the print layer that hardly changes. As a result, it is possible to alleviate the deterioration of the design caused by providing the machine-readable code.

A correction rate of the machine-readable code 34 is preferably 20% or more and 60% or less. When a QR code is used as the machine-readable code 34, an error correction level is preferably H (correction rate: 30%). When an iQR code is used instead of the conventional QR code, the error correction level is preferably H (correction rate: 30%) or S (correction rate: 50%).

Figure 21:
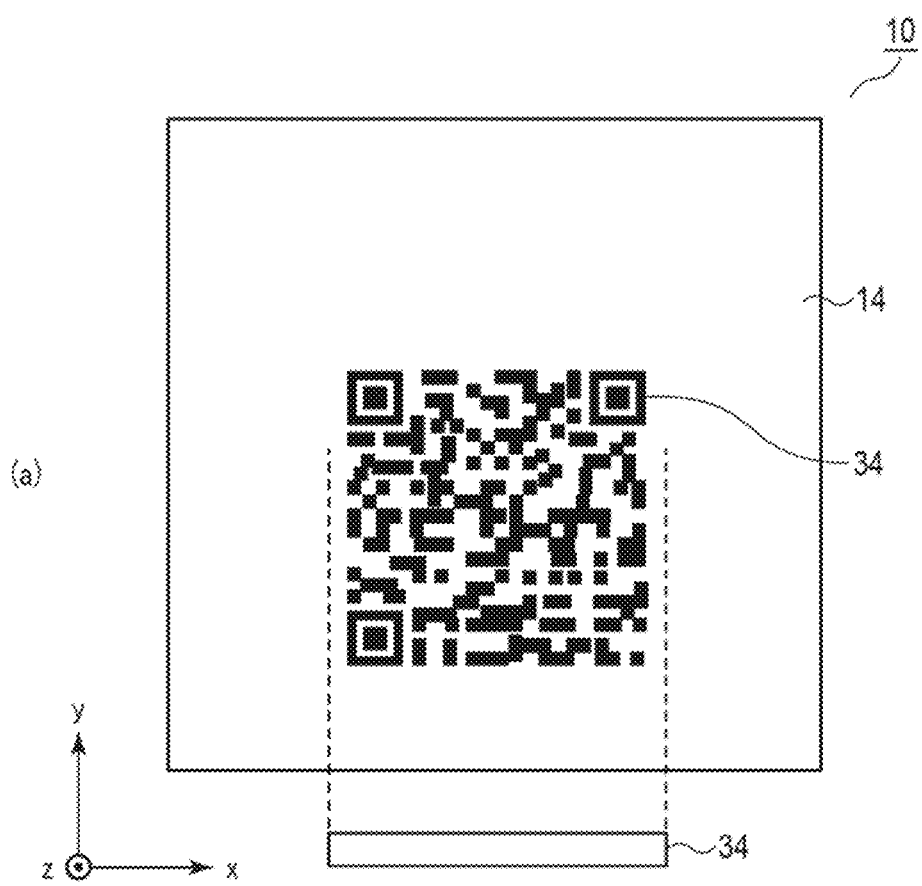
FIG. 21 is a plan view and a cross-sectional view showing an example of the optical film in which a machine-readable code and the reconstruction points are combined (a case of forming a machine-readable code at the reconstruction points).
Figure 21:
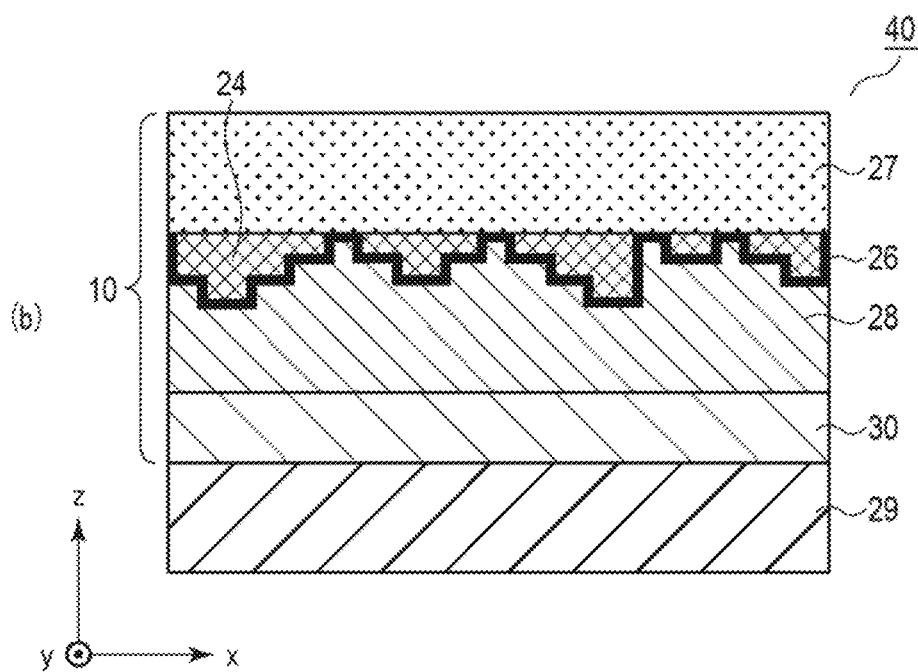

The machine-readable code 34 can also be configured by the reconstruction points 22, as shown in FIGS. 21(a) and 21(b). In order to implement this, an optical film which has a transparent reflective layer and on which the machine-readable code 34 is recorded is laminated on a pattern of the functional layer 30 of the object 29. In the above configuration, the machine-readable code 34 is blurred under normal lighting conditions (diffusion illumination), so that only the pattern can be observed. Therefore, the design of the pattern is not disturbed. On the other hand, when light is illuminate using a point light source such as LED lighting (strobe lighting) of a smartphone, etc., the machine-readable code 34 with high luminance (e.g., QR code) is reconstructed, so that a camera can be focused on the QR code, and the content of the machine-readable code 34 can be read.

In order to reliably read the content of the machine-readable code 34, the machine-readable code 34 is preferably reconstructed at a distance of 5 mm to 25 mm from the functional layer 30 of the object 29. If the distance to the functional layer 30 is smaller than this the discrimination between the pattern of the functional layer 30 and the machine-readable code 34 is reduced. On the other hand, if the distance from the functional layer 30 is Greater than this, a reconstructed image of the machine-readable code 34 is easily blurred.

The correction rate of the machine-readable code 34 is preferably 20% or more and 60% or less. When a QR code is used as the machine-readable code 34, the error correction level is preferably H (correction rate: 30%). When an iQR code is used instead of the conventional QR code, the error correction level is preferably H (correction rate: 30%) or S (correction rate: 50%). The machine-readable code 34 may be recorded in both the functional layer 30 and the reconstruction points 22.

Figure 22:
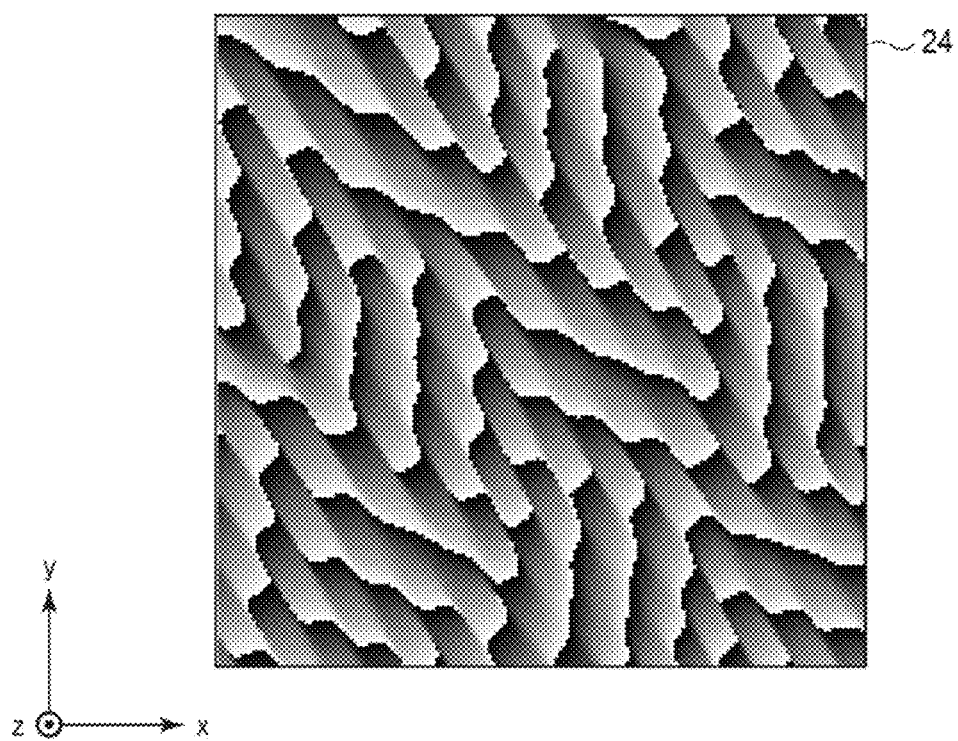
FIG. 22 is a plan view showing an example of data recorded in a phase angle recording area in which a pattern for reconstructing a reconstructed image is drawn.

FIG. 22 is a plan view showing an example of data recorded in the phase angle recording area 18 for reconstructing a desired reconstructed image.

Figure 23:
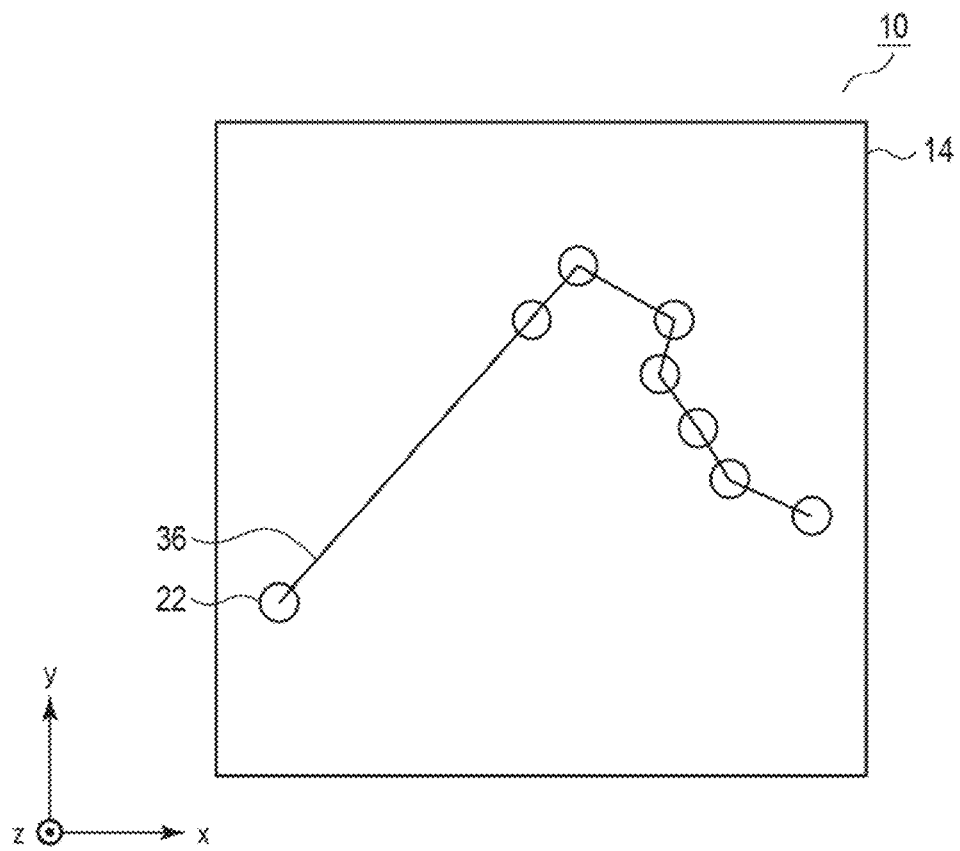
FIG. 23 is a plan view showing an example of an optical film in which patterns are combined using a fluorescent paint.

FIG. 23 shows an example of a combination of patterns using a fluorescent paint 36. When light is turned on using a light source, the reconstruction points 22 are reconstructed, and when light is turned off, a portion coated with the fluorescent paint 36 produces color, so that both the lighting state and the non-lighting state can be handled.

Figure 24:
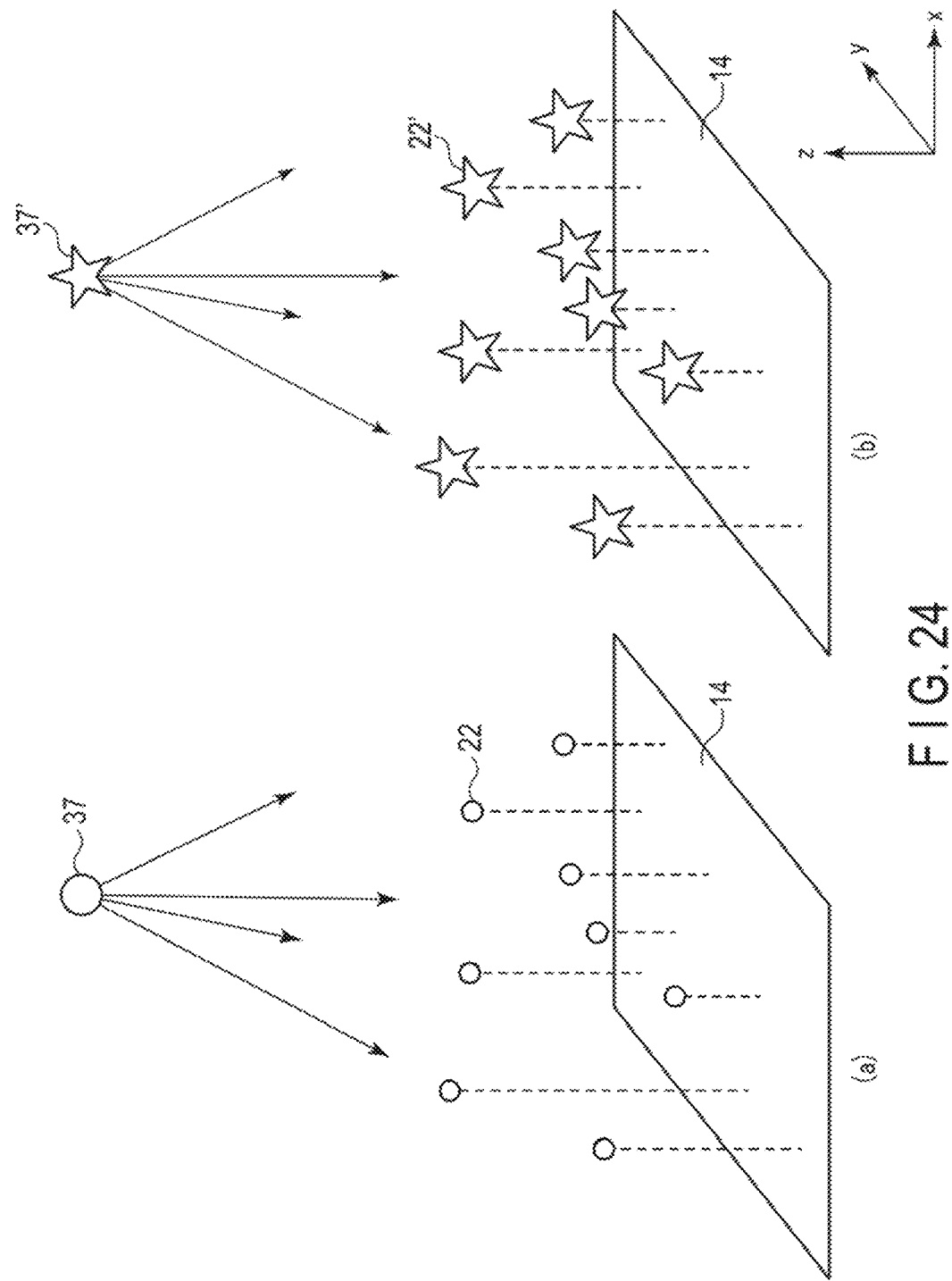
FIG. 24 is a perspective diagram illustrating a relationship between a shape of an illuminating light source and a shape of a point light source.

FIG. 24 is a perspective view showing a relationship between the shape of an illuminating light source 37 and the shape of the reconstruction points 22. The reconstruction points 22 are spaced from each other, as shown in FIG. 23, so that blurring due to the size of a reconstructed image reconstructed by the reconstruction points 22 can be eliminated. At this time, when the illuminating light source 37 has a circular shape, circular reconstruction points 22 can be reconstructed, as shown in FIG. 24(a), and when the illuminating light source 37' has a star shape, star-shaped reconstruction point 22' images can be reconstructed, as shown in FIG. 24(b).

As described above, according to the optical film 10 of the present embodiment, a phase angle $\varphi$ is converted into a height of the unevenness of the unit block 12 in the overlapping area 19, and unevenness having the height corresponding to the phase angle $\varphi$ is formed in the corresponding unit block 12 in the overlapping area 19, so that a reconstructed image can be reconstructed at the reconstruction points 22.

Third Embodiment

Figure 25:
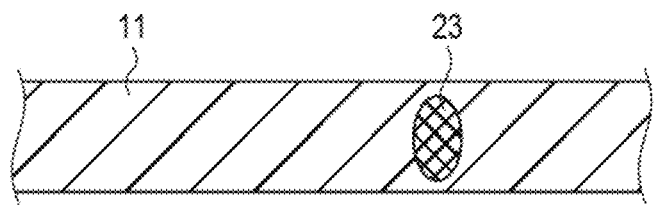
FIG. 25 is a cross-sectional view of the substrate showing a state in which a void is embedded therein.

In the first embodiment, the case of recording the numerical information of the corresponding phase angle $\varphi$ in the unit block 12 in the overlapping area 19 is described. In the optical film 10 according to the present embodiment, instead of recording the numerical information of the phase angle $\varphi$, the computing device converts the change in the phase angle $\varphi$ into the amount of change of the refractive index of the recording surface 14. Also, the computing device converts it into a void that realizes the amount of change of the refractive index. The phase angle $\varphi$ is recorded in the unit block 12 in the overlapping area 19 by embedding the void 23 in the substrate 11 corresponding to the location of the unit block 12 in the overlapping area, for example, as shown in FIG. 25.

As described above, according to the optical film 10 of the present embodiment, the change in the phase angle $\varphi$ is converted into the amount of change of the refractive index of the recording surface 14, and the void 23 realizing the amount of change is embedded in the substrate 11 corresponding to the location of the unit block 12 in the overlapping area, so that a reconstructed image can be reconstructed at the reconstruction points 22.

Working Examples

First, an example of a simulation of a reconstructed image reconstructed using the phase angle $\varphi$ computed as described in the first embodiment will be described.

Figure 26:
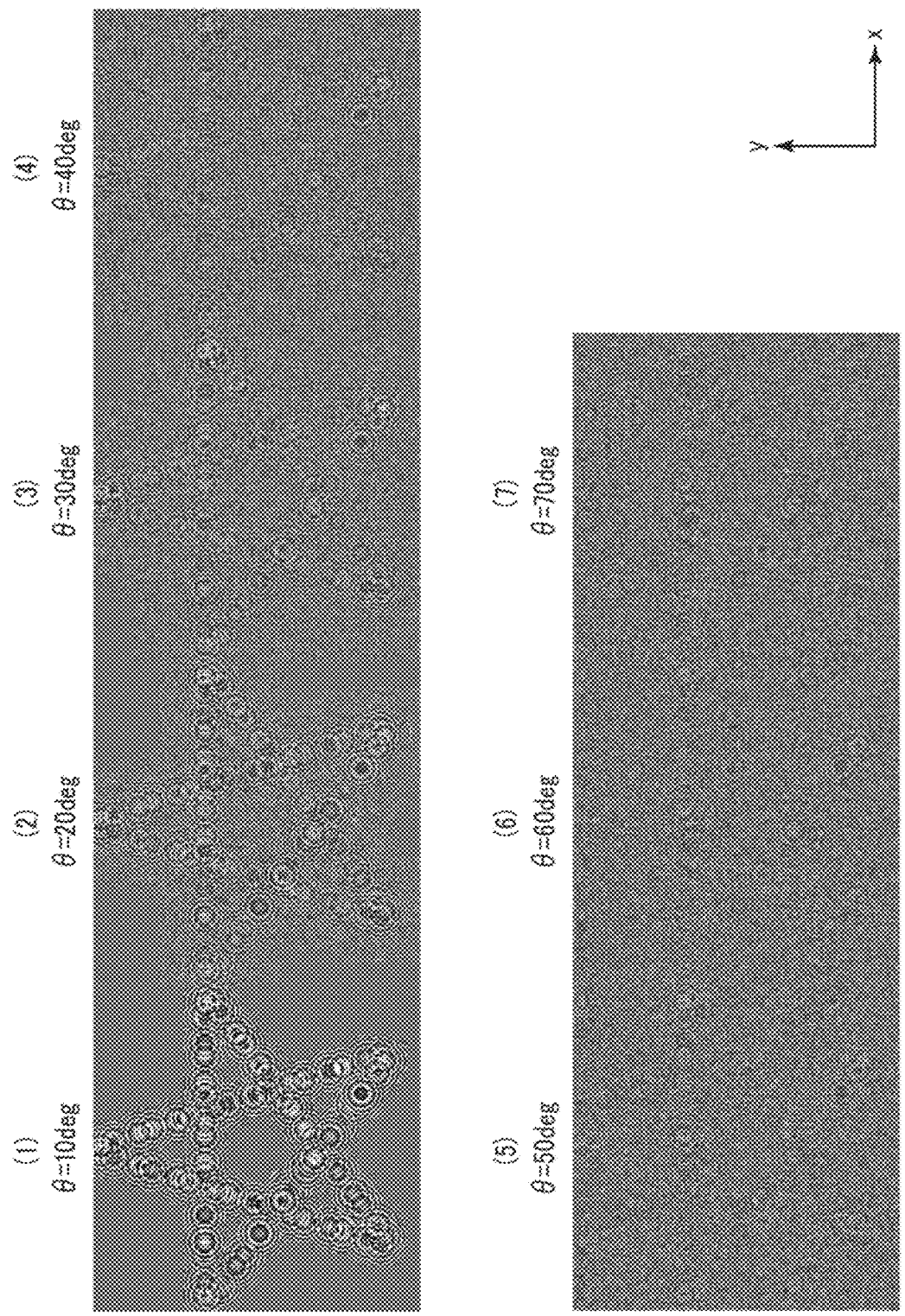
FIG. 26 is a bitmap image illustrating results showing, with shading, phase angles of reconstructed images in a phase angle recording area in which a pattern for reconstructing a hologram image is drawn.
Figure 27:
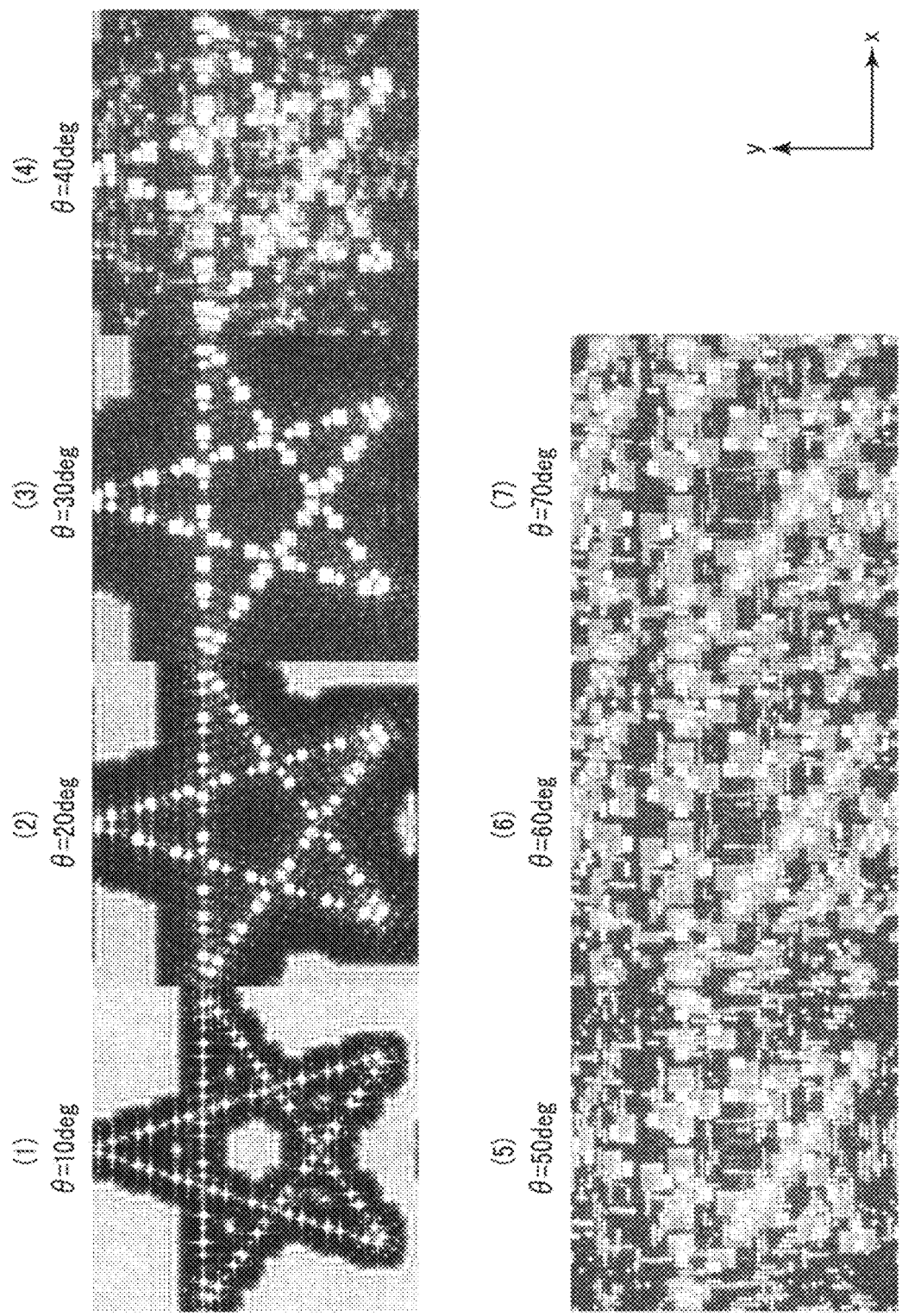
FIG. 27 is a bitmap image illustrating simulation results of reconstructed images reconstructed at the reconstruction points (a case where light is applied).
Figures 28, 29:
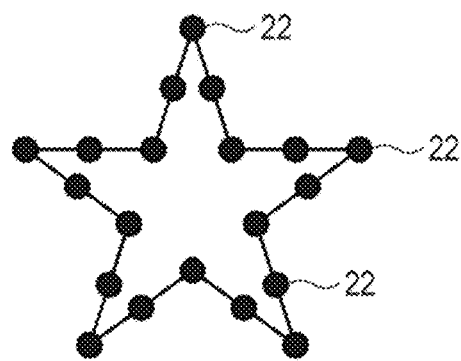
FIG. 28 is a diagram listing the conditions of each of the cases shown in FIGS. 26 and 27.
FIG. 29 is a diagram showing an example of the arrangement of the reconstruction points considered in each of the cases shown in FIGS. 26 and 27.

FIGS. 26 and 27 are bitmap images respectively illustrating reconstructed images reconstructed at the reconstruction points 22, which were obtained by simulation in each of the cases shown in FIG. 28.

FIG. 28 shows the conditions for simulation, and shows the relationship between the viewing angle $\theta$ and m. Simulation was conducted on seven cases having a combination of the viewing angle $\theta$ and m as shown in FIG. 28. In this example, the size of the recording surface 14 was 250 nm, the light wavelength $\lambda$ was 500 nm, the pixel number XPIXEL in the X direction of the recording surface 14 was 1024, and the pixel number YPIXEL in the Y direction was 1024. Also, a star shape as shown in FIG. 29 was assumed for the reconstruction points 22. The phase angle non-recording area 20 was not taken into consideration on the recording surface 14.

FIG. 26 is an example of a bitmap image obtained by simulation in a state where no light is applied. FIG. 27 is an example of a bitmap image obtained by simulation in a state where light is applied. FIGS. 26(1) to (7) correspond to cases 1 to 7, respectively. Also, in FIG. 27, the white portion corresponds to a structure with high unevenness, and the black portion corresponds to a structure with low unevenness.

A case where m is 1 corresponds to a viewing angle $\theta$ that is an optical theoretical limit. It is understood that when m is less than 3 (i.e., case 4 to case 7), noise is generated as m decreases, and a star-shaped reconstructed image cannot be obtained successfully, as shown in FIG. 27. Therefore, it is understood that cases 3, 2, and 1, in which m is 3 or more with respect to the limit resolution, are acceptable as reconstructed images.

Namely, it was demonstrated that a reconstructed image reconstructed at the reconstruction points 22 can be properly reconstructed by computing the phase angle $\varphi$ for the computation element section 16 specified by the viewing angle $\theta$ defined as shown in the above-described equation (1).

Next, the effect of reducing the computing time by setting the phase angle non-recording area 20 on the recording surface 14 will be described.

FIG. 30 shows the shape patterns of the three cases (a, b, and c) shown in FIG. 31, which were implemented to show the effect of reducing the computing time by setting the phase angle non-recording area 20 on the recording surface 14. In these cases, the size of the recording surface 14 was 250 nm, the light wavelength λ was 500 nm, the pixel number XPIXEL in the X direction of the recording surface 14 was 1024, the pixel number YPIXEL in the Y direction was 1024, and the number N of reconstruction points 22 was 170.

Case a indicates a shape pattern in which the entire surface of the recording surface 14 is the phase angle recording area 18, as shown in FIG. 30(a). Case b indicates a shape pattern in which the phase angle recording area 18 and the phase angle non-recording area 20 are alternately arranged to form a stripe, as shown in FIG. 30(b). Case c indicates a shape pattern in which the phase angle recording areas 18 are arranged to form a lattice shape, and the remaining area is the phase angle non-recording area 20, as shown in FIG. 30(c). The occupancy rate of the phase angle recording area 18 on the recording surface 14 is the highest in case a, and decreases in the order of case b to case c.

FIG. 31 also shows the computing time spent for computation in each case under such conditions. It is understood that as the occupancy rate of the phase angle recording area 18 on the recording surface 14 decreases, that is, as the occupancy rate of the phase angle non-recording area 20 on the recording surface 14 increases, the computing time is reduced, as shown in FIG. 31.

The stripe shape shown in FIG. 30(a) and the rectangular shape shown in FIG. 30(b) can also be realized within the dotted line portion of the FIG. 17 in FIG. 10 described above. Thereby, it is possible to reduce the computing time while making a pattern.

(Modification)

A modification of the optical film 10 described in the above embodiments will be described.

For example, according to the optical film 10 of the above-described embodiments, it is possible to print a character, pattern, etc., in the phase angle non-recording area 20, so that the phase angle non-recording area 20 is effectively used.

FIG. 32 shows an example of this: FIG. 32(a) is a plan view; and FIG. 32(b) is a cross-sectional view taken along line A-A' in FIG. 32(a).

As in the case of FIG. 3, in the optical film 10 shown in FIG. 32, a plural strip-shaped phase angle recording areas 18 are periodically arranged on the recording surface 14 to form a stripe shape, as shown in the plan view provided in FIG. 32(a). Also, a letter 32, which is an alphabetical letter "A," is printed over the plurality of phase angle non-recording areas 20.

As shown in the cross-sectional diagram provided in FIG. 32(b), a pattern for reconstructing a desired reconstructed image is drawn in the phase angle recording area 18 by the phase angle recording layer 24, and the letter 32 is printed in the phase angle non-recording area 20 by ink or the like.

According to such an optical film 10, a desired reconstructed image is reconstructed at the reconstruction points 22 by the pattern drawn in the phase angle recording area 18, and the letter 32 printed in the phase angle non-recording area 20 is also displayed. Therefore, it is possible to convey two types of information to an observer.

Information that can be conveyed using the phase angle non-recording area 20 is not limited to the printed letter 32.

Figure 33:
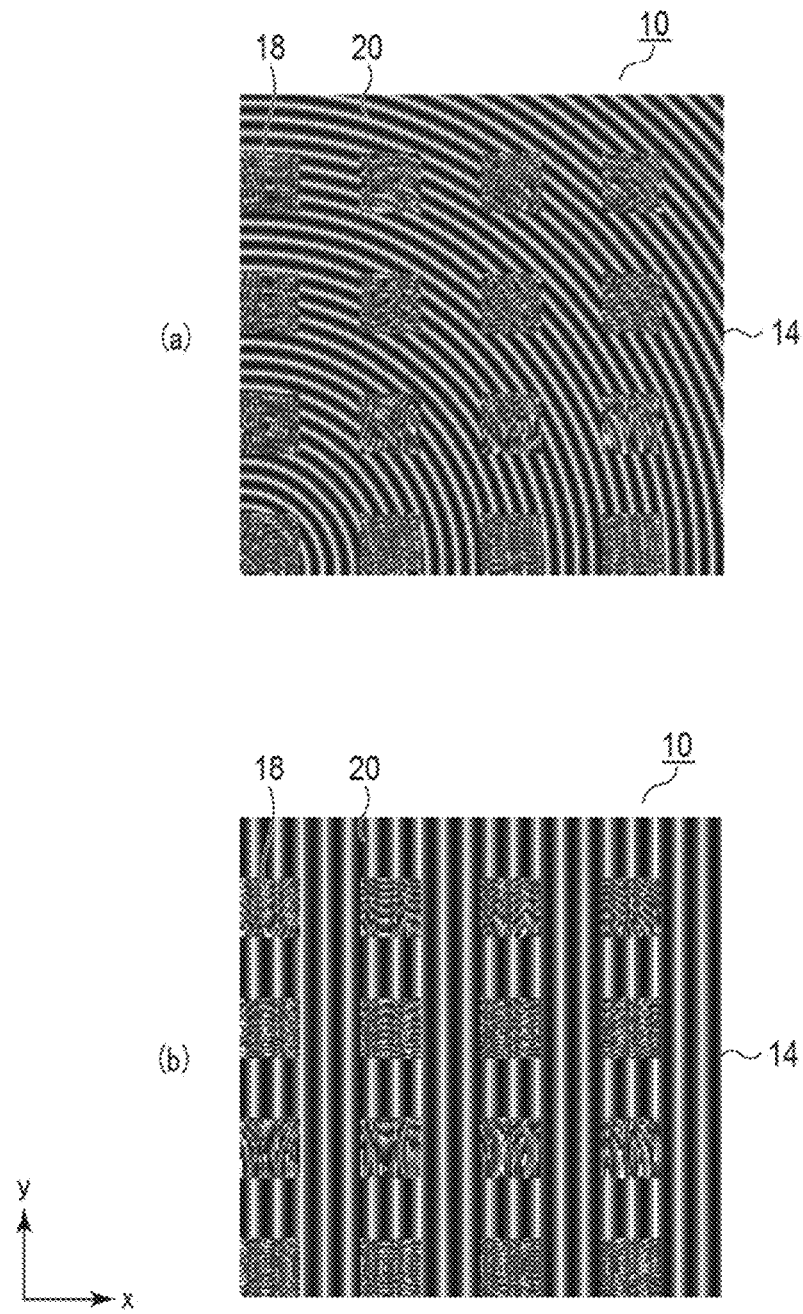
FIG. 33 is a diagram showing an example of an optical film in which a diffraction grating is embedded in the phase angle non-recording area.

FIG. 33 is a plan view showing an example in which a diffraction grating is inserted in the phase angle non-recording area 20.

In the optical film 10 illustrated in FIG. 33, a plural phase angle recording areas 18 forming a rectangular shape are two-dimensionally and periodically arranged on the recording surface 14 to form a lattice shape, in a manner shown in FIG. 4. Also, a diffraction grating is inserted in the phase angle non-recording area 20.

FIG. 33(a) shows an example in which an arc-shaped diffraction grating is inserted over the entire phase angle non-recording area 20. FIG. 33(b) shows an example in which a linear diffraction grating is inserted over the entire phase angle non-recording area 20.

Inserting a diffraction grating in the phase angle recording area 20 as described above also makes it possible to convey multiple pieces of information to an observer. The diffraction grating to be inserted in the phase angle non-recording area 20 is not limited to those having a general shape as shown in FIGS. 33(a) and 33(b), and a diffraction grating of any shape may be inserted. For example, another optical film as shown in FIGS. 32 and 33 may be inserted into a portion of the FIG. 17 in FIG. 10 corresponding to the phase angle non-recording area 20 (e.g., the eye and the mouth of the mark of the FIG. 17). In addition, the present invention is not limited to using diffraction characteristics of light, but includes a configuration in which various optical characteristics such as scattering and reflection of light are used to input various kinds of information.

The best modes for carrying out the present invention have been described with reference to the attached drawings. However, the present invention is not limited thereto. Those skilled in the art would conceive of various modifications and amendments within the scope of the technical idea of the invention as claimed, and those modifications and amendments also fall within the technical scope of the present invention.

The invention claimed is:

1. An optical film with a recording surface, the recording surface comprising:
    a computation element section in which a phase component of light from each reconstruction point of a reconstructed image is computed, the computation element section corresponding to each reconstruction point one by one;
    a phase angle recording area in which a phase angle computed based on the phase component is recorded; and
    a phase angle non-recording area in which the phase angle is not recorded,
    the phase angle computed based on the phase component being recorded in an overlapping area where the computation element section and the phase angle recording area overlap each other.

2. The optical film according to claim 1, wherein the phase component of light from each reconstruction point is computed for each unit block, and the phase angle computed based on the phase component is recorded in the phase angle recording area for each unit block.

3. The optical film according to claim 2, wherein the computation element section is defined by a viewing angle θ shown in an equation of $\theta < (A/m)$,
    where in a case of $(\lambda/2d) \leq 1$, $A = \mathrm{asin}(\lambda/2d)$, $\lambda$ is a wavelength of the light, d is an arrangement interval of the unit blocks in a viewing angle direction, and m is a real number of 3 or more.

4. The optical film according to claim 2, wherein the phase angle is computed from the phase component according to an equation of $$W(kx, ky) = \sum_{n=0}^{Nmax} \sum_{ky=Ymin}^{Ymax} \sum_{kx=Xmin}^{Xmax} amp \cdot \exp(i\phi)$$

$$\phi = \frac{\pi}{\lambda \cdot O_n(z)}\{(O_n(x) - kx)^2 + (O_n(y) - ky)^2\}$$

where W(kx, ky) is a phase component, n is a number of reconstruction points, and is an integer of zero or more and Nmax or less, amp is amplitude of light at a reconstruction point, i is an imaginary number, λ is a wavelength of light for reconstruction, $O_n$(x, y, z) are coordinates of the reconstruction point, (kx, ky, 0) are coordinates of the unit block, φ is a phase angle, and Xmin, Xmax, Ymin, and Ymax are coordinates defining a range of the computation element section and vary for each reconstruction point.

5. The optical film according to claim 1, wherein a machine-readable code is recorded in the phase angle recording area.

6. The optical film according to claim 1, wherein the phase angle non-recording area is a mirror surface.

7. The optical film according to claim 1, wherein information other than the phase angle is recorded in the phase angle non-recording area.

8. The optical film according to claim 7, wherein the information other than the phase angle is information including at least one of scattering, reflection, or diffraction characteristics of light.

9. The optical film according to claim 1, wherein the plural phase angle recording areas having a strip shape are periodically arranged on the recording surface to form a stripe shape.

10. The optical film according to claim 1, wherein the plural phase angle recording areas having a rectangular shape are periodically and two-dimensionally arranged to form a lattice shape.

11. The optical film according to claims 1 to 10, wherein the phase angle recording area has a shape of a figure representing a character or a pattern.

12. The optical film according to claim 11, wherein the figure is used as personal authentication information.

13. The optical film according to claim 1, wherein the plural computation element sections do not overlap each other within the phase angle recording area.

14. The optical film according to claim 1, wherein the plural reconstruction points are present on a same plane parallel to the recording surface.

15. The optical film according to claim 13, wherein each of the plural computation element sections not overlapping each other is colored with a different color.

16. The optical film according to claim 1, wherein the phase angle is recorded as a height of the unit block on the recording surface in the overlapping area.

17. The optical film according to claim 1, wherein a void is embedded in a corresponding unit block in the overlapping area, thereby recording the phase angle in the overlapping area, wherein a void amount of the void on the recording surface is modulated according to the phase angle.

18. A display body comprising the optical film according to claim 1 attached to an object.

19. The display body according to claim 18, wherein a transparent reflective layer is provided on the recording surface of the optical film.

20. The display body according to claim 18, wherein the object has a functional layer.

21. The display body according to claim 20, wherein the functional layer is a print layer.

22. The display body according to claim 20, wherein a machine-readable code is recorded in the functional layer.

* * * * *

UNITED STATES PATENT AND TRADEMARK OFFICE
CERTIFICATE OF CORRECTION

PATENT NO. : 10,948,876 B2  
APPLICATION NO. : 16/203198  
DATED : March 16, 2021  
INVENTOR(S) : Akihito Kagotani Page 1 of 1

It is certified that error appears in the above-identified patent and that said Letters Patent is hereby corrected as shown below:

In the Claims

Column 24, Line 5 In Claim 11, delete "claim 1 to 10," and insert -- claim 1, --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*